United States Patent
Arakane et al.

(10) Patent No.: US 11,001,076 B2
(45) Date of Patent: May 11, 2021

(54) IMAGE PROCESSING APPARATUS AND NON-TRANSITORY COMPUTER-READABLE RECORDING MEDIUM THEREFOR

(71) Applicant: Brother Kogyo Kabushiki Kaisha, Nagoya (JP)

(72) Inventors: Satoru Arakane, Nagoya (JP); Masashi Kuno, Obu (JP); Shota Morikawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/688,335

(22) Filed: Nov. 19, 2019

(65) Prior Publication Data

US 2020/0156385 A1 May 21, 2020

(30) Foreign Application Priority Data

Nov. 20, 2018 (JP) .............................. JP2018-217119

(51) Int. Cl.
*B41J 2/21* (2006.01)

(52) U.S. Cl.
CPC .................................. *B41J 2/2132* (2013.01)

(58) Field of Classification Search
CPC ...... B41J 2/2132; B41J 2/2054; B41J 19/142; G06K 15/107
USPC .......................................... 347/9, 12, 14, 15
See application file for complete search history.

(56) References Cited

U.S. PATENT DOCUMENTS

| | | | | |
|---|---|---|---|---|
| 9,481,188 B2* | 11/2016 | Kujiraoka | ............... | B41J 2/2132 |
| 10,363,735 B2* | 7/2019 | Morikawa | ............ | B41J 2/04586 |
| 10,596,822 B2* | 3/2020 | Ohara | ........................ | B41J 2/52 |
| 2001/0005212 A1* | 6/2001 | Otsuki | ................... | B41J 19/142 |
| | | | | 347/41 |

FOREIGN PATENT DOCUMENTS

| | | | |
|---|---|---|---|
| JP | 2005-342962 A | 12/2005 | |
| JP | 2011-084005 A | 4/2011 | |

\* cited by examiner

*Primary Examiner* — An H Do
(74) *Attorney, Agent, or Firm* — Banner & Witcoff, Ltd.

(57) ABSTRACT

An image processing apparatus is configured to generate a plurality of pieces of partial printing data by executing a generating process including a color conversion process. A printing execution device performs N-th and (N+1)-th partial printing. An area in which the N-th partial printing is performed includes an overlap area, and first and second non-overlap areas respectively arranged on upstream and downstream sides, in the conveying direction, with respect to the overlap area. In the overlap area, dots are formed by both the N-th and (N+1)-th partial printings. The color conversion process includes a first converting process for the first non-overlap area with reference to a first profile, a second converting process for the second non-overlap area with reference to a second profile, and a third converting process for the overlap area, the third converting process being different from both the first and second converting process.

20 Claims, 13 Drawing Sheets

IMAGE PROCESSING APPARATUS AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2018-217119 filed on Nov. 20, 2018. The entire subject matter of the application is incorporated herein by reference.

BACKGROUND

Technical Field

The present disclosures relate to an image processing apparatus which has a printing execution device configured to perform a partial printing to form a sectional image by dots (e.g., ink droplets) with executing a main scanning, and perform the partial printing by a plurality of times with executing a sub scanning The present disclosures also relate to a non-transitory computer-readable recording medium storing instructions to be executed by a controller of such an image processing apparatus.

Related Art

Conventionally, there is known a print system configured to perform a bidirectional printing. Typically, in order to perform the bidirectional printing, a forward path printing which is a printing operation performed in a forward movement in the main scanning, and a backward path printing which is a printing operation performed in a backward movement (which is an movement in a direction opposite to the forward movement) in the main scanning direction are combined. Among print systems configured to perform the bidirectional printing, there is known a print system in which end portions, in the sub scanning direction, of a printing region of the forward path printing and end portions, in the sub scanning direction, of a printing region of the backward path printing are overlapped.

There is known another print system configured to perform a bidirectional printing. In this system, a first conversion table is used when print data for the forward path printing is generated and a second conversion table is used when print data for the backward path printing is generated.

SUMMARY

According to the above-described print systems, when the bidirectional printing is performed, the color difference may be conspicuous between an image printed in the overlapped portion and an image printed at a portion next to the overlapped portion.

According to aspects of the present disclosures, there is provided an image processing apparatus configured to perform image processing for a printing execution device having a print head provided with first type of nozzles configured to eject first type of ink, second type of nozzles configured to eject second type of ink, the second type of nozzles being arranged at positions different, in a main scanning direction, from positions where the first type of nozzles are arranged, a main scanning device configured to perform main scanning to move the print head in the main scanning direction relative to a printing medium, a sub scanning device configured to perform sub scanning to move the printing medium relative to the print head in a sub scanning direction which intersects with the main scanning direction, the printing execution device being configured to perform printing by performing partial printing of forming dots on the print medium using the print head with performing the main scanning and the sub scanning by a plurality of times. The image processing apparatus has a storage configured to store a plurality of profiles each defining relationship between a first color value and a second color value, the second color value including component values corresponding to a plurality of types of ink including the first type of ink and the second type of ink, the plurality of profiles including a first profile corresponding to a first printing direction along the main scanning direction and a second profile corresponding to a direction opposite to the first printing direction and a controller. The controller is configured to execute an image obtaining process for obtaining target image data including a plurality of the first color values respectively corresponding to a plurality of pixels, a print data generating process for generating, using the target image data, a plurality of pieces of partial printing data including N-th partial printing data for an N-th partial printing performed in the first printing direction, N being an integer greater than zero, and (N+1)-th partial printing data for an (N+1)-th partial printing performed in the second printing direction, and a print process for controlling the printing execution device to print a print image based on the target image data by causing the printing execution device to perform a plurality of times of the partial printing including the N-th partial printing and the (N+1)-th partial printing using the plurality of pieces of partial printing data. An area in which the N-th partial printing is performed includes a first overlap area in which dots are formed by both the N-th partial printing and the (N+1)-th partial printing and a first non-overlap area which is located on a downstream side, in the sub scanning direction, with respect to the first overlap area, the first non-overlap area being an area in which dots are formed by the N-th partial printing but no dots are formed by the (N+1)-th partial printing. An area in which the (N+1)-th partial printing is performed includes the first overlap area and a second non-overlap area which is located on an upstream side, in the sub scanning direction, with respect to the first overlap area, the second non-overlap area being an area in which no dots are formed by the N-th partial printing but dots are formed by the (N+1)-th partial printing. The controller is configured to execute a first converting process to be applied to data included in the target image data and corresponding to the first non-overlap area, the first converting process converting each of the plurality of first type color values to the second type color values with reference to the first profile, a second converting process to be applied to data included in the target data and corresponding to the second non-overlap area, the second converting process converting each of the plurality of first type color values to the second type color values with reference to the second profile, and a third converting process to be applied to data included in the target data and corresponding to the first overlap area, the first converting process being different from the first converting process and the second converting process.

According to aspects of the present disclosures, there is provided a non-transitory computer-readable recording medium for an image processing apparatus which is configured to control a printing execution device having a print head provided with first type of nozzles configured to eject first type of ink, second type of nozzles configured to eject second type of ink, the second type of nozzles being arranged at positions different, in a main scanning direction, from positions where the first type of nozzles are arranged, a main scanning device configured to perform main scanning to move the print head in the main scanning direction relative to a printing medium, a sub scanning device configured to perform sub scanning to move the printing medium relative to the print head in a sub scanning direction which intersects with the main scanning direction, the printing execution device being configured to perform printing by performing partial printing of forming dots on the print medium using the print head with performing the main scanning and the sub scanning by a plurality of times. The recording medium stores instructions which cause, when executed by a controller of the image processing apparatus, the image processing apparatus to perform obtaining target image data including a plurality of the first color values respectively corresponding to a plurality of pixels, generating, with use of the target image data, a plurality of pieces of partial printing data including N-th partial printing data for an N-th partial printing performed in the first printing direction, N being an integer greater than zero, and (N+1)-th partial printing data for an (N+1)-th partial printing performed in the second printing direction, the generating process including a color conversion process of converting each of the plurality of first type color values to the second type color values, and controlling the printing execution device to print a print image based on the target image data by causing the printing execution device to perform a plurality of times of the partial printing including the N-th partial printing and the (N+1)-th partial printing using the plurality of pieces of partial printing data. An area in which the N-th partial printing is performed includes a first overlap area in which dots are formed by both the N-th partial printing and the (N+1)-th partial printing, and a first non-overlap area which is located on a downstream side, in the sub scanning direction, with respect to the first overlap area, the first non-overlap area being an area in which dots are formed by the N-th partial printing but no dots are formed by the (N+1)-th partial printing. An area in which the (N+1)-th partial printing is performed includes the first overlap area, and a second non-overlap area which is located on an upstream side, in the sub scanning direction, with respect to the first overlap area, the second non-overlap area being an area in which no dots are formed by the N-th partial printing but dots are formed by the (N+1)-th partial printing. The color conversion process includes a first converting process to be applied to data included in the target image data and corresponding to the first non-overlap area, the first converting process being performed with reference to the first profile, a second converting process to be applied to data included in the target data and corresponding to the second non-overlap area, the second converting process being performed with reference to the second profile, and a third converting process to be applied to data included in the target data and corresponding to the first overlap area, the first converting process being different from the first converting process and the second converting process.

According to aspects of the present disclosures, there is provided an image processing apparatus which is provided with a print head, a carriage mounting the print head and configured to move the print head in a first direction relative to a printing medium, a conveying device configured to move the printing medium relative to the print head in a second direction which intersects with the first direction, a storage configured to store a first profile corresponding to the first direction and a second profile corresponding to a direction opposite to the first direction and a controller. The controller is configured to execute generating, using target image data including a plurality of first color values respectively corresponding to a plurality of pixels, a plurality of pieces of partial printing data including N-th partial printing data for an N-th partial printing performed in the first direction, N being an integer greater than zero, and (N+1)-th partial printing data for an (N+1)-th partial printing performed in the direction opposite to the first direction. The controller is configured to further execute printing, using the print head, in a first printing area based on the N-th partial printing data, the first printing area including a first overlap area and a first non-overlap area, and printing, using the printing head, in a second printing area based on the (N+1)-th partial printing data, the second printing area including the first overlap area and a second non-overlap area. The controller is configured to execute a first converting, at the first non-overlap area, each of the plurality of first type color values to a second type color values with reference to the first profile, a second converting, at the second non-overlap area, each of the plurality of first type color values to the second type color values with reference to the second profile, and a third converting, at the first overlap area, each of the plurality of first type color values to the second type color values, the third converting being different from the first converting and the second converting.

BRIEF DESCRIPTION OF THE ACCOMPANYING DRAWINGS

FIG. 1 is a block diagram of a print system according to the present disclosures.

FIGS. 2A and 2B schematically show a configuration of a printing mechanism.

Figure 7A:
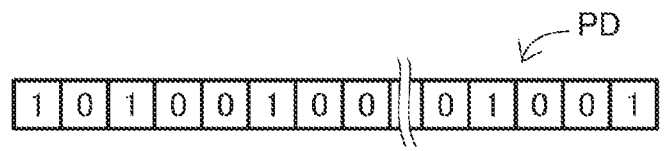

FIG. 7A schematically shows a configuration of distribution pattern data.

Figure 7B:
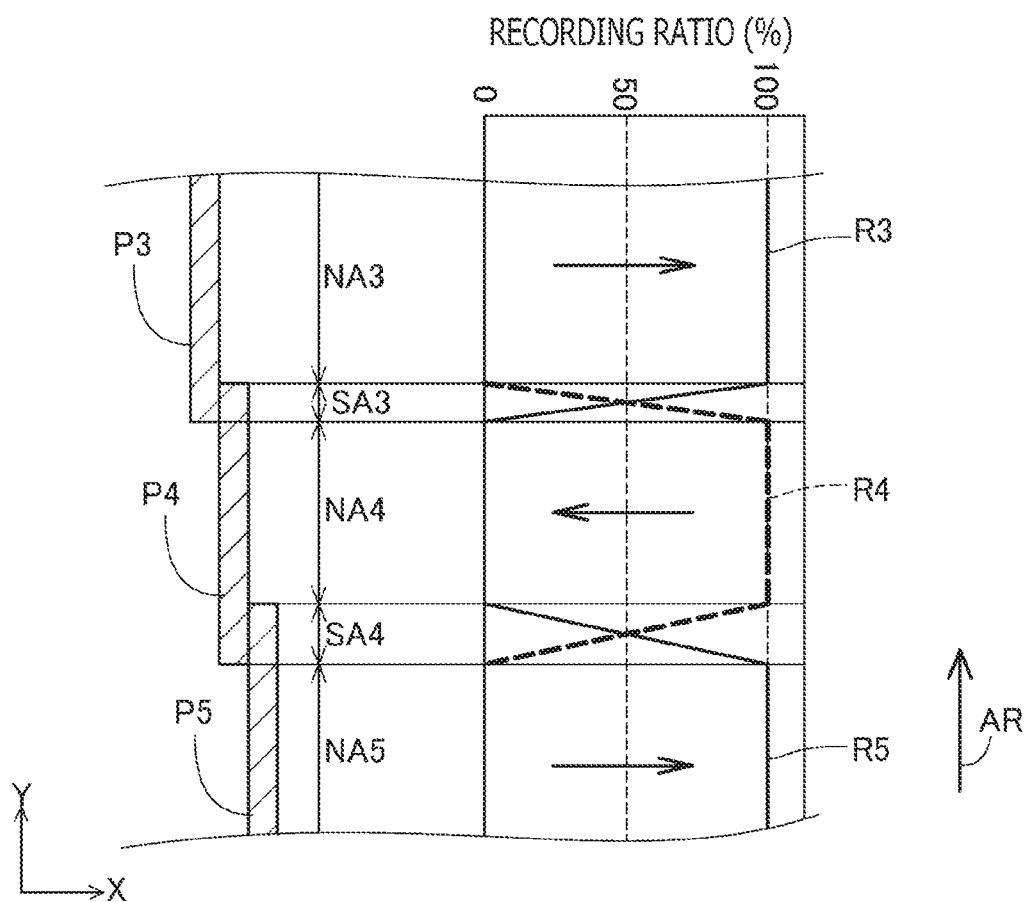

FIG. 7B shows recoding ratios of in partial printing at head positions of P3-P5.

Figure 8:
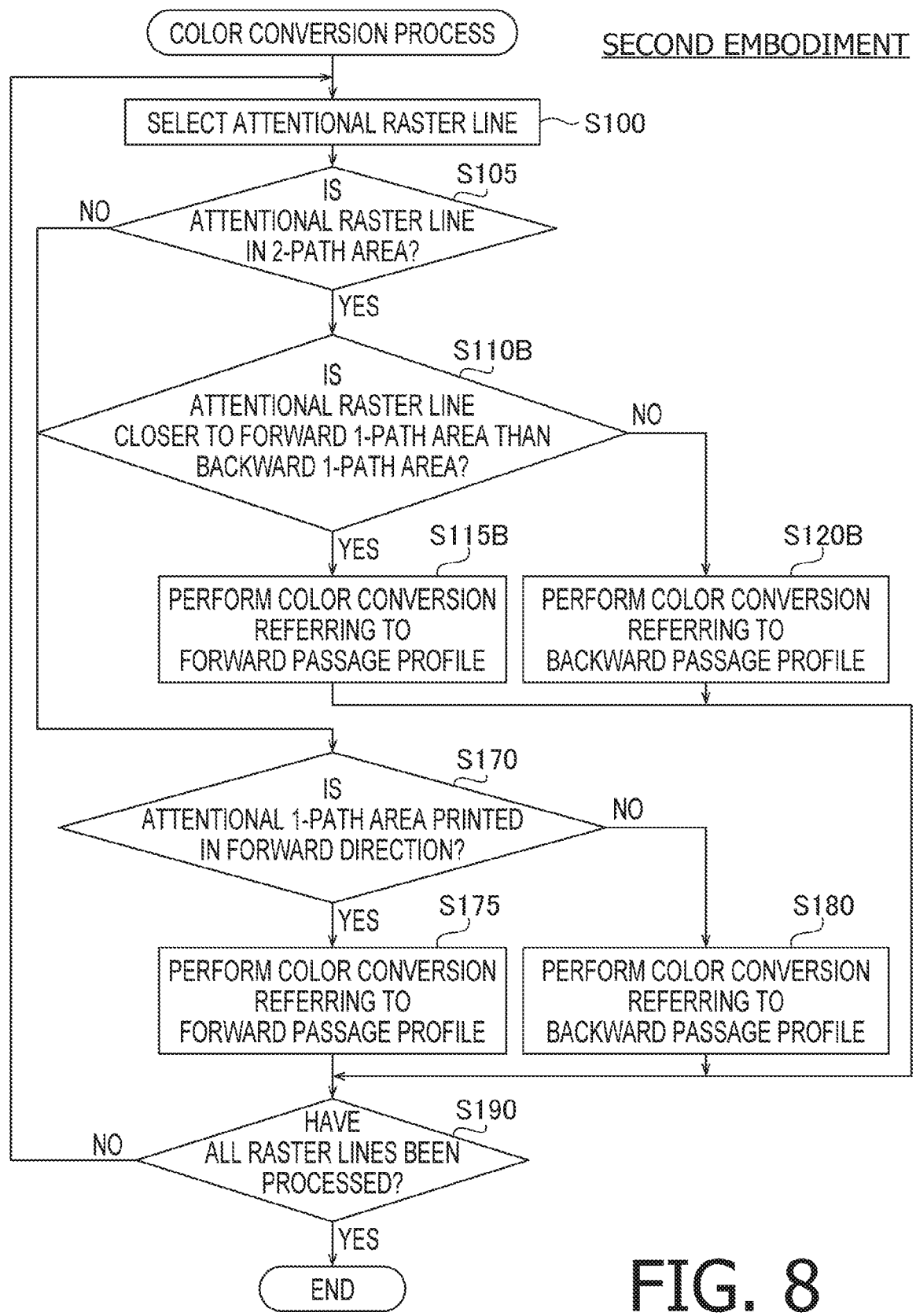

FIG. 8 is a flowchart illustrating a color conversion process according to a second embodiment of the present disclosures.

Figure 9:
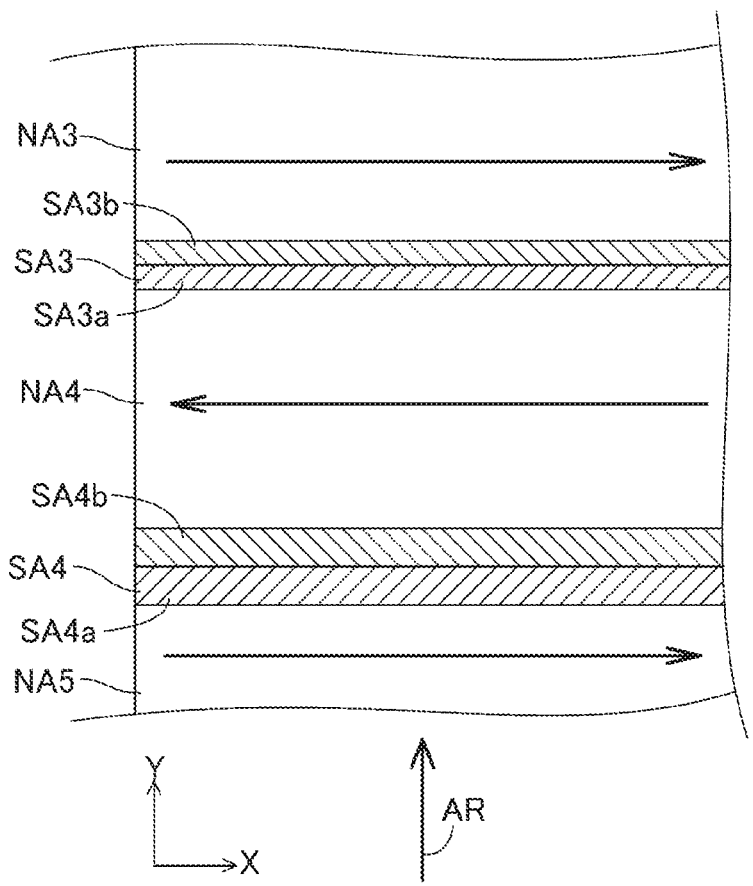

FIG. 9 illustrates the color conversion process according to the second embodiment.

Figure 10:
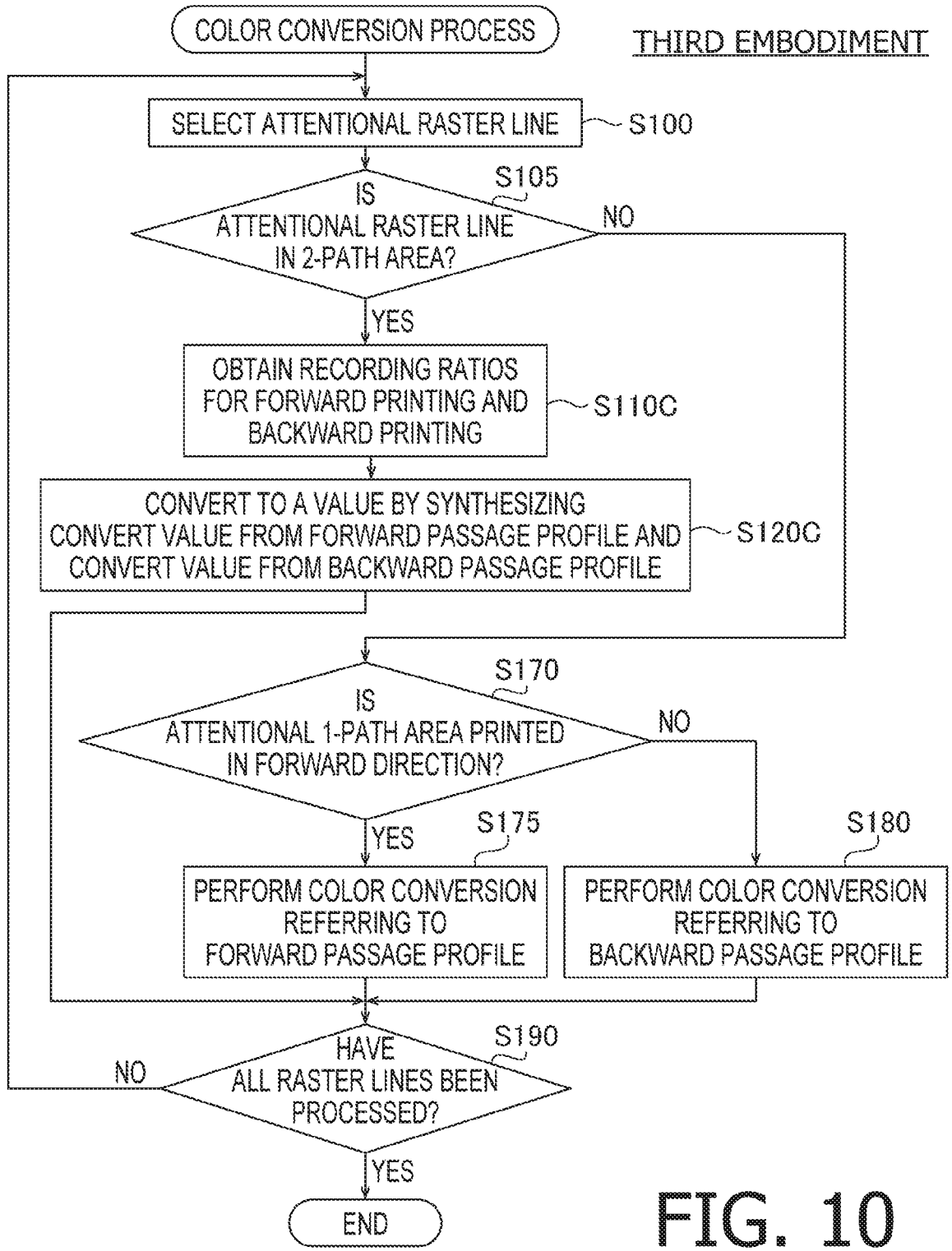

FIG. 10 is a flowchart illustrating a color conversion process according to a third embodiment of the present disclosures.

Figure 11:
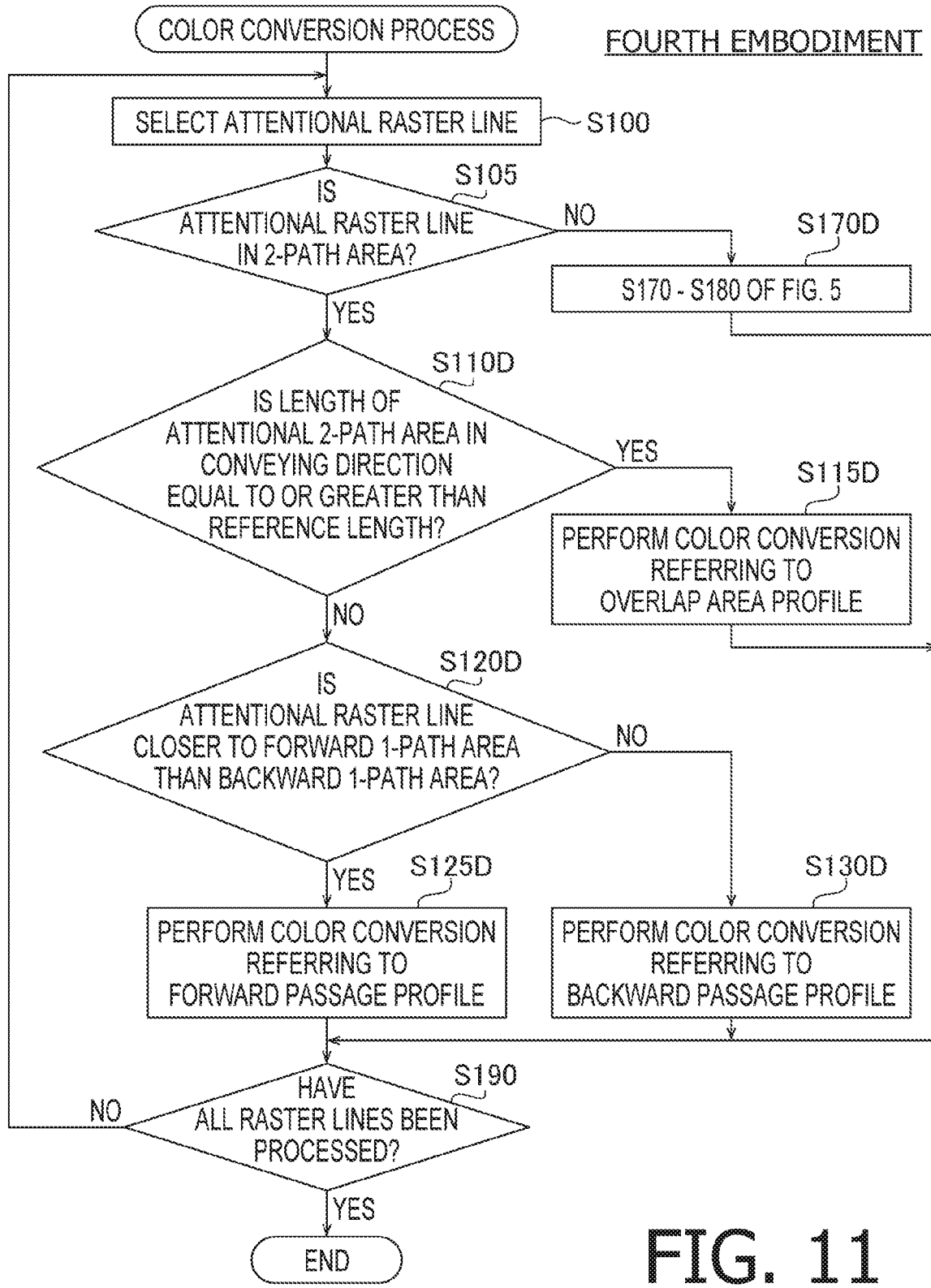

FIG. 11 is a flowchart illustrating a color conversion process according to a fourth embodiment of the present disclosures.

Figure 12:
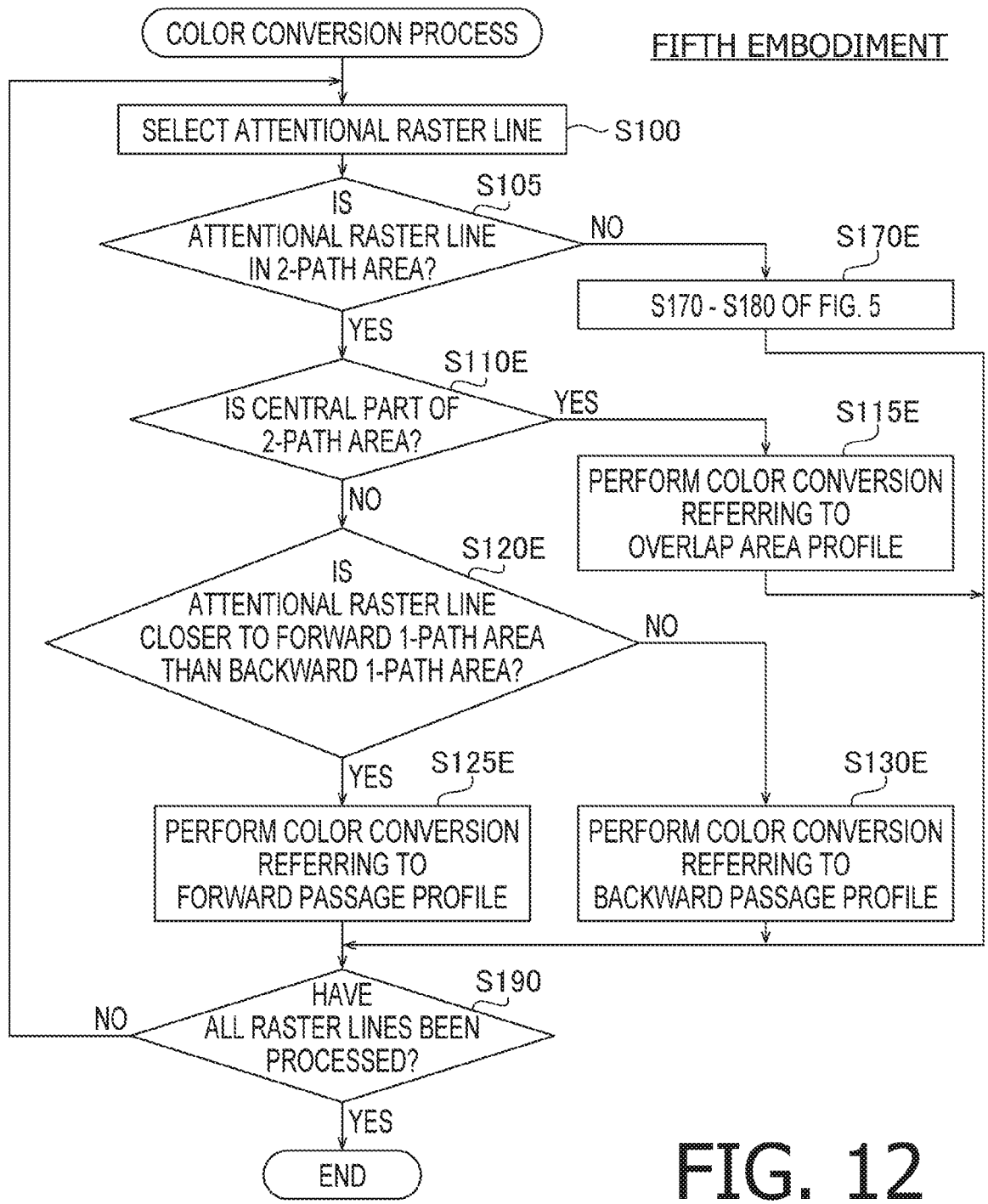

FIG. 12 is a flowchart illustrating a color conversion process according to a fifth embodiment and a sixth embodiment of the present disclosures.

Figure 13:
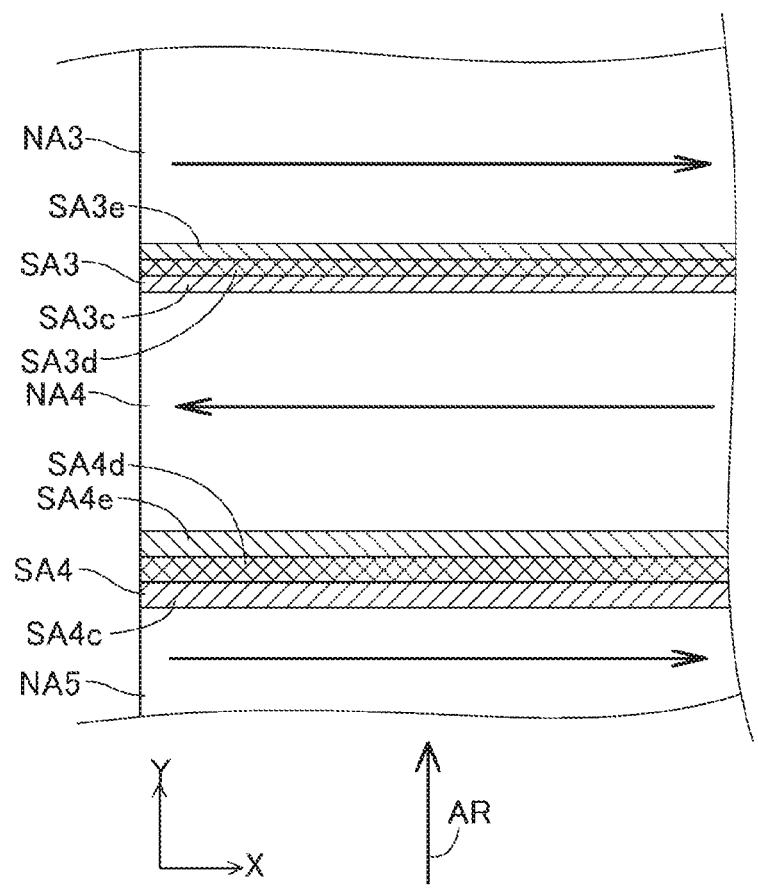

FIG. 13 illustrates the color conversion process according to the fifth embodiment and the sixth embodiment.

DETAILED DESCRIPTION OF THE EMBODIMENTS

A. First Embodiment

A-1. Configuration of Print System

Figure 1:
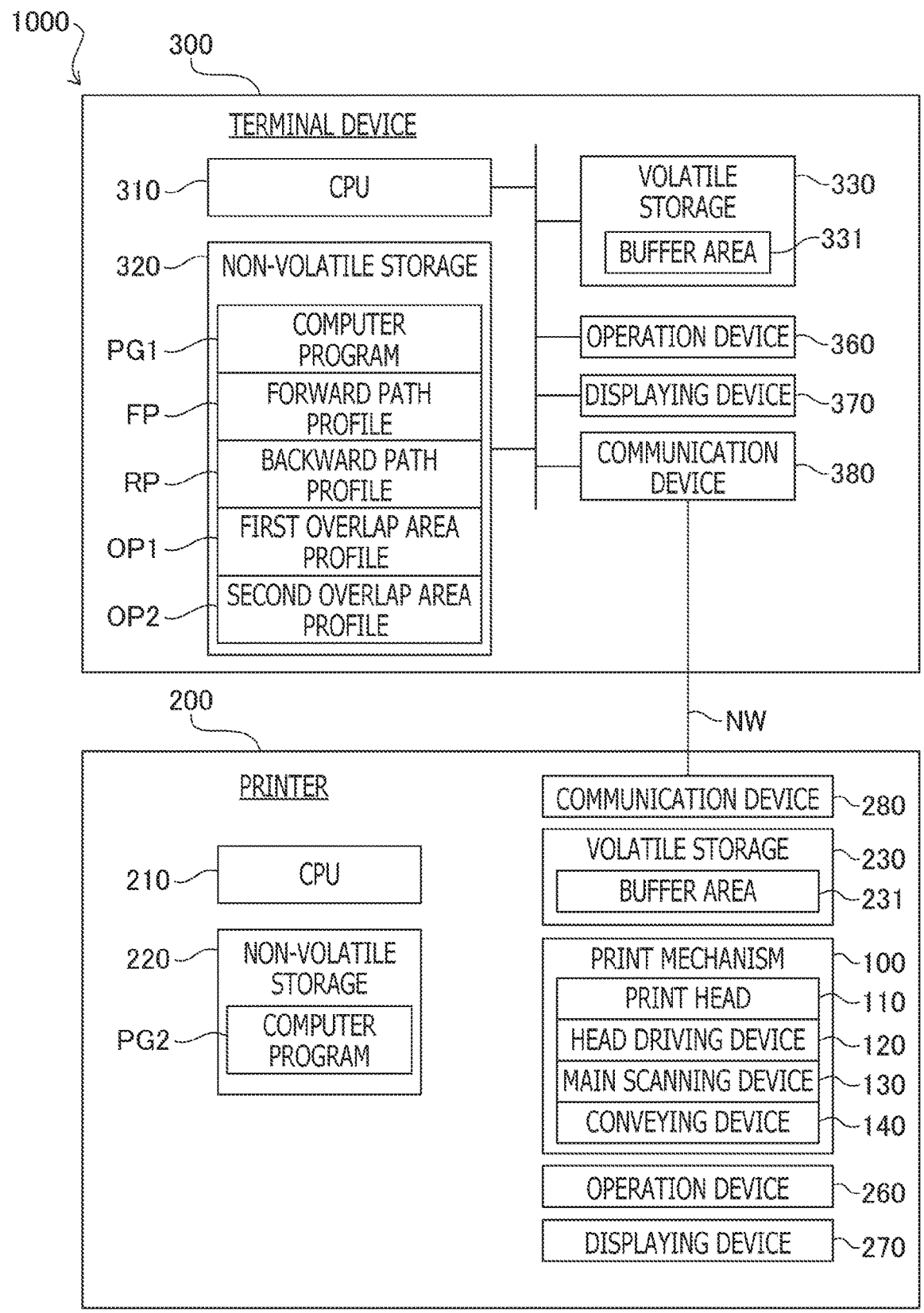

Hereinafter, embodiments according to the present disclosures will be described, referring to the accompanying drawings. FIG. 1 is a block diagram showing a configuration of a print system 1000 according to the present disclosures.

The print system 1000 includes a printer 200 and a terminal device 300 which is an example of an image processing apparatus according to aspects of the present disclosures. The printer 200 and the terminal device 300 are communicably connected through a network NW which may be a wireless or a wired network.

The terminal device 300 is a computer used by a user of the printer 200. Examples of the terminal device 300 is a personal computer, or a smartphone. The terminal device 300 includes a CPU 310 which is a controller of the terminal device 300, a non-volatile storage 320 such as a hard disk drive, a volatile storage 330 such as a RAM, an operation device 360 such as a mouse and a keyboard, a displaying device 370 such as an LCD and a communication device 380. The communication device 380 includes a wired or wireless interface configured to connect the terminal device 300 to the network NW.

The volatile storage 330 provides a buffer area 331 for the CPU 310. The non-volatile storage 320 stores a computer program PG1 and a plurality of profiles FP, RP, OP1 and OP2. The computer program PG and the plurality of profiles FP, RP, OP1 and OP2 are provided by a manufacturer of the printer 200 such that they are downloaded from a server or stored in a recording medium such as a DVD-ROM. The CPU 310 executes the computer program PG1 and servers as a printer driver which controls operations of the printer 300. The CPU 310 serving as the printer driver performs, for example, an image processing which will be described later to cause the printer 200 to print an image.

The plurality of profiles FP, RP, OP1 and OP2 are profiles defining correspondence between color values of the RGB color representation system (i.e., RGB values) and color values of the CMYK color representation system (i.e., CMYK values). The plurality of profiles FP, RP, OP1 and OP2 are used in a color conversion process, which will be described later, to convert the RGB values to the CMYK values. The RGB values are color values including three component values of a Red (R) value, a Green (G) value and a Blue (B) value. The CMYK values are color values including a plurality of number of components corresponding to the number of ink colors to be used for printing. According to the present embodiment, the CMYK values include four components of a Cyan (C) value, a Magenta (M) value, a Yellow (Y) value and a black (K) value. Each component value of the RGB values and the CMYK values are 256-gradation value. The plurality of profiles FP, RP, OP1 and OP2 are provided, for example, in the form of a lookup table. The plurality of profiles FP, RP, OP1 and OP2 themselves will be describe later.

The printer 200 is provided with, for example, a printing mechanism 100, a CPU 210 serving as a controller of the printer 200, a non-volatile storage 220 such as a hard disk drive, a volatile storage 230 such as a RAM, an operation device 360 such as buttons and a touch panel for receiving user operations/inputs, a displaying device 270 such as an LCD and a communication device 280. The communication device 280 includes a wireless or wired interface through which the printer 200 is to be connected to the network NW. The printer 200 is communicably connected to an external device such as the terminal device 300 through the communication device 28 and the network NW.

The volatile storage 230 provides a buffer area 231 which is used to temporarily store various pieces of intermediate data which may be generated when the CPU 210 performs various processes. In the non-volatile storage 220, a computer program PG2 is stored. According to the present embodiment, the computer program PG2 is a program to control the printer 200 and may be stored in the non-volatile storage 220 at a time when the printer 200 is shipped. Alternatively, the computer program PG2 may be provided so as to be downloaded from a server, or provided in the form of a DVD-ROM or the like. By executing the computer program PG2, the CPU 210 performs an image processing and, in the image processing, controls the printing mechanism 100 to print an image on a recording medium (e.g., a printing sheet) in accordance with print data and direction information (described later) transmitted from the terminal device 300.

The printing mechanism 100 performs printing by ejecting droplets of the C ink, the M ink, the Y ink and the K ink. The printing mechanism 100 has a print head 110, a head driving device 120, a main scanning device 130 and a conveying port 140.

Figure 2A:
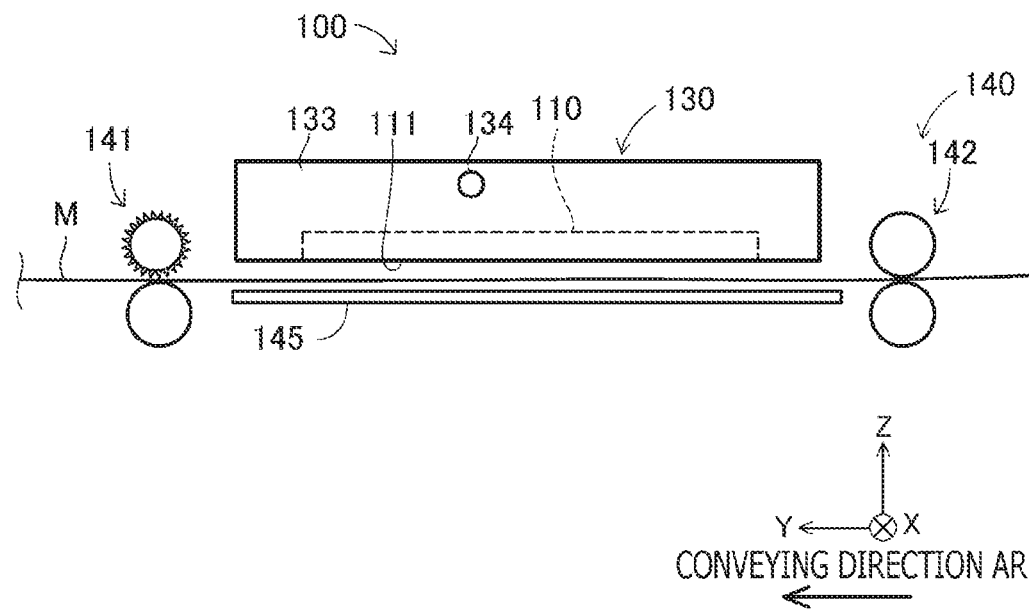
Figure 2B:
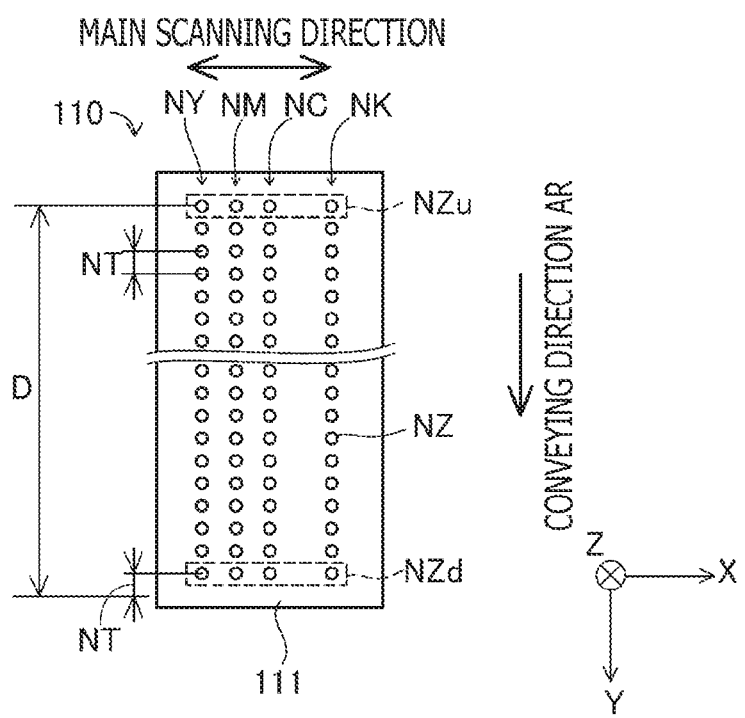

FIGS. 2A and 2B schematically show a configuration of the printing mechanism 100. As shown in FIG. 2A, the main scanning device 130 has a carriage 133 mounting the print head 110 and a sliding shaft 134 holding the carriage 133 so at to be reciprocally movable in a main scanning direction (i.e., an X-axis direction in FIG. 2A). The main scanning prat 130 is configured to reciprocally move the carriage 133 along the sliding shaft 134 with use of a driving force of a main scanning motor (not shown). According to the above-described configuration, a main scanning to reciprocally move the print head 110, relative to the sheet M, along a main scanning direction is achieved.

The conveying device 140 conveys the sheet M in a conveying direction AR (i.e., Y-axis positive direction in FIG. 2) which is a direction perpendicular to the main scanning direction, with holding the sheet M. As shown in FIG. 2, the conveying device 140 has a sheet table 145, an upstream side roller pair 142 and a downstream roller pair 141. In the following description, the upstream side (i.e., Y-axis negative direction side) in the conveying direction AR will also be simply referred to as an upstream side, while the downstream side (i.e., Y-axis positive direction side) in the conveying direction AR will also be simply referred to as a downstream side.

The upstream side roller pair 142 is configured to hold the sheet M on the upstream side with respect to the print head 110, while the downstream side roller pair 141 is configured to hold the sheet M on the downstream side with respect to the print head 110. The sheet table 145 is arranged between the upstream side roller pair 142 and the downstream side roller pair 141, and at a position where the sheet table 145 faces a nozzle surface 111 of the print head 110. As the downstream roller pair 141 and the upstream roller pair 142 are driven by a motor (not shown), the sheet M is conveyed.

The head driving device 120 (see FIG. 1) is configured to drive the print head 110 by supplying a driving signal to the print head 110 when the main scanning device 130 is performing the main scanning of the print head 110. The print head 110 ejects, in accordance with the driving signal, ink droplets on the sheet, which is being conveyed by the conveying device 140, to form dots thereon.

FIG. 2B schematically shows a structure of the print head 110 viewed from a Z-axis negative direction side (i.e., from the downside in FIG. 2A). As shown in FIG. 2B, on the nozzle surface 111 of the print head 110, a plurality of nozzle arrays, each includes a plurality of nozzles, is formed. Specifically, the plurality of nozzle arrays includes nozzle arrays NC, NM, NY and NK configured to eject ink droplets of C (cyan) ink, M (magenta) ink, Y (yellow ink) and K (black ink), respectively. Each of the nozzle arrays includes a plurality of nozzles NZ. The plurality of nozzles NZ of each nozzle array are arranged in the conveying direction AR and at a particular nozzle intervals of NT. It is noted that the nozzle interval NT is a length between two adjacent nozzles NZs which are of the same nozzle array and arranged to be adjacent to each other. Among the nozzles forming each nozzle array, the nozzle NZ on the most upstream side will be referred to a most upstream side nozzle NZu and the nozzle NZ on the most downstream side will be referred to a most downstream side nozzle NZd. Further, a length, in the conveying direction AR, from the most upstream side nozzle NZu to the most downstream side nozzle NZd added with the nozzle interval NT will be referred to as a nozzle length D.

The positions, in the main scanning direction, of the nozzle arrays NC, NM, NY and NK are different from each other, while the positions, in the sub scanning direction, thereof overlap each other. For example, in the example shown in FIG. 2B, the nozzle array NM is arranged on the X-axis plus side with respect to the nozzle array NY.

A-2. Image Processing

Figure 3:
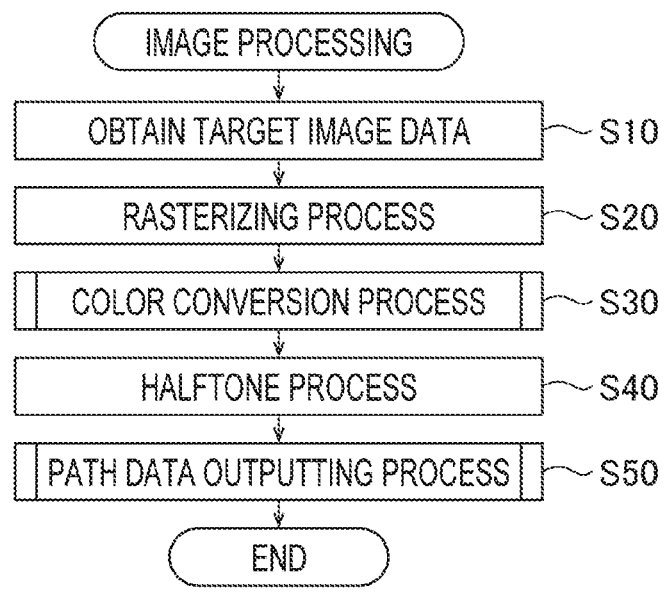
FIG. 3 is a flowchart illustrating an image processing according to the present disclosures.

The CPU 310 (see FIG. 1) of the terminal device 300 performs image processing in accordance with a print instruction input by the user. The print instruction incudes designation of image data representing an image to be printed. FIG. 3 shows a flowchart illustrating the image processing. In S10, the CPU 310 obtains the image data designated by the print instruction from the volatile storage 330. The image data as obtained may be of image data in compressed JPEG format or any other format such as image data described in a page description language.

In S20, the CPU 310 applies a rasterizing process to the obtained image data to generate RGB image data indicating RGB values of each pixel, thereby RGB image data, which is target data in the present embodiment, being obtained. The RGB values indicate color values of R (red), G (green) and B (blue) components, respectively.

In S30, the CPU 310 applies a color conversion process to the RGB image data to generate CMYK image data which indicates CMYK values of each pixel. It is noted that the CMYK values indicate color values of C (cyan), M (magenta), Y (yellow) and K (black) components for each pixel. The color conversion process will be described in detail later.

In S40, the CPU 310 applies a halftone process to the CMYK image data to generate dot data indicating a dot forming status of each dot for each color component of the CMYK image data. A value of the dot data for each pixel indicates the dot forming status with two gradations of "dot exists" and "no dot exists," or four gradations of "no dot," "small dot," "medium dot" and "large dot." The halftone process is performed with use of a well-known method such as a dithering method or an error diffusion method. The dot data is image data representing a print image PI (which will be described later) indicating dots to be formed on the printing medium.

In S50, the CPU 310 performs a path data outputting process with use of the dot data. Specifically, the CPU 310 generates data (i.e., path data) corresponding to partial printing SP for one time to be included in the dot data, and transmits the path data to the printing mechanism 100 with adding various pieces of control data thereto. The control data includes data designating a conveying amount of sheet conveyance T after performing the partial printing SP. Output of the path data will be described later in detail.

As above, the CPU 310 is configured to cause the printing mechanism 100 to print the print image PI. Concretely, the CPU 310 controls the head driving device 120, the main scanning device 130 and the conveying device 140 to alternately perform the partial printing SP and sheet conveyance T by a plurality of times, thereby performing printing the entire image. In one partial printing SP, in a state where the sheet M is stayed on the sheet table 145 unmoved, the CPU 310 performs one main scanning with ejecting the ink droplets on the sheet M through the nozzles NZ of the print head 110, thereby a part of the image to be formed is printed on the sheet M. it is noted that one sheet conveyance T is a process of conveying the sheet M in the conveying direction AR by a particular conveying amount. According to the present embodiment, the CPU 310 is configured to cause the printing mechanism 100 to perform m times (m being an integer equal to or greater than three) of partial printings SPm.

Figure 4:
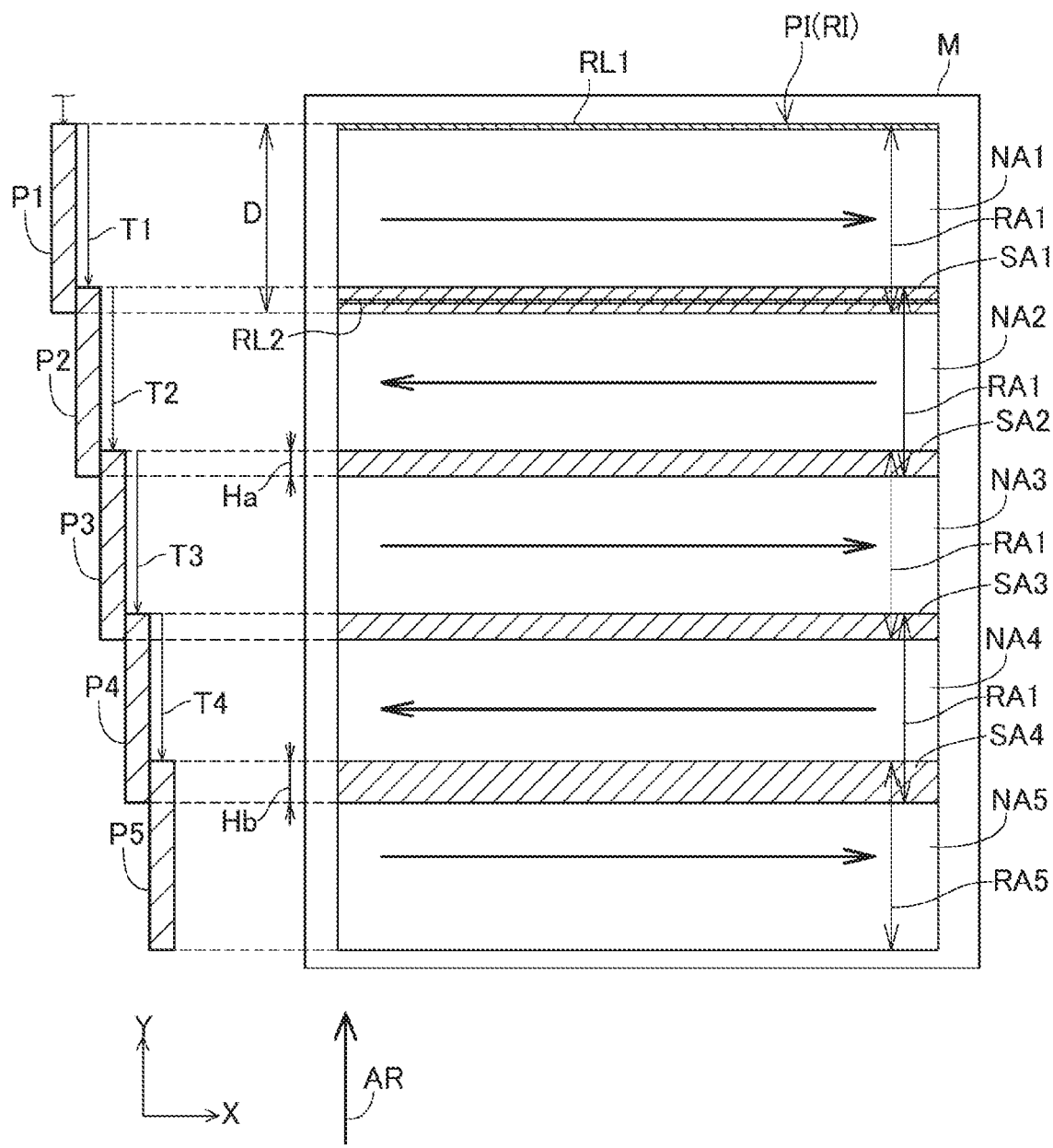
FIG. 4 illustrates how a print image is printed on a sheet.

FIG. 4 illustrates printing of the print image PI on the sheet M. In the example shown in FIG. 4, the print image PI is printed by five executions of partial printing SP (i.e., m=5). Further, in FIG. 4, head positions P, that is, relative positions, in the conveying direction AR, of the print head 110 with respect to the sheet M are indicated for each partial printing SP (i.e., for each execution of the main scanning) In FIG. 4, for each execution of the partial printing SP, path number k (k being an integer which is equal to or greater than one and equal to or smaller than m) is assigned to the indication "SP" as "SPk" which indicates an k-th partial printing. Further, the head position P, in the conveying direction AR, of the print head 110 when the k-th partial printing is performed is indicated as a head position Pk. Further, the sheet conveyance T performed between the k-th partial printing SPk and the (k+1)-th partial printing SP(k+1) is indicated as a k-th sheet conveyance Tk. In FIG. 4, the positions P1-P5 and sheet conveyances T1-T4 corresponding to the partial printings SP1-SP5 are indicated.

It is noted that, in FIG. 4, the print image PI formed on the sheet m includes a plurality of non-overlapping areas (which are also referred to as one-path areas) NA1-NA5 (which are non-hatched areas in FIG. 4) and a plurality of overlapping areas (two-path areas) SA1-SA4 (which are hatched areas in FIG. 4).

Each of the one-path areas NA1-NA5 is an area within which an image is formed by a single partial printing. Concretely, in the one-path area NAk, an image can be formed by the k-th execution of the partial printing SPk, that is, the partial printing SPk which is performed when the head position is Pk.

The two-path areas SA1 and SA2 are areas in which images are formed in two executions of the partial printing. Concretely, in the two-path area SAk, images are formed in the k-th execution of partial printing SPk and the (k+1)-th execution of the partial printing SP(k+1). That is, in the two-path area SAk, dots are formed in the partial printing SPk executed when the head position is Pk and the in the partial printing SP(k+1) executed when the head position is P(k+1). The two-path area SAk is located between the one-path area NAk and the one-path area NA(k+1).

As shown in FIG. 4, a partial area RA1 in which an image is formed by one execution of the partial printing SP1 includes the one-path area NA1 and the two-path area SA1 which is on the upstream side with respect to the one-path area NA1. Each of partial areas RA2-RA4 in which images are formed by second through fourth executions of the partial printings SP2-SP4, respectively, includes the one-path area NAk, the two-path area SAk which is on the upstream side with respect to the one-path area NAk and the two-path area SA(k-1) which is on the downstream side with respect to the one-path area NAk, k being any of two through four. A partial area RA5 in which an image is formed by the last (i.e., fifth) execution of the partial printing SP5 includes the one-path area NA and the two-path area SA4 which is on the downstream side with respect to the one-path area NA5.

The reason why the two-path area SAk is provided will be explained. It is assumed that the two-path area SAk is not provided and the print image is composed of only an image to be printed in the one-path area (such an image will be referred to as a one-path partial image). In such a case, due to unevenness of conveying amounts of the sheet M and the like, a so-called banding occurs. The banding is a defect that white or black lines are formed at a boundary between images between two one-path sectional images which are adjacent to each other in the conveying direction AR. The banding deteriorates the image quality of the print image PI. By providing a two-path area SAk between the two one-path area NAk and printing an image (which will be called as a two-path partial image) in the two-path area NAk, the banding can be suppressed. Since, in the two-path partial image, dots on one raster line are formed in two partial printings, it is possible to suppress a situation where all the dots on one raster line are shifted in the same manner with respect to all the dots on another raster line.

It is noted that, when an image is printed on the sheet M, due to the sheet M absorbing the ink, the sheet M be deformed relatively easily. Further, the last partial printing SP5 is performed with the sheet M being not held by the upstream side roller pair 142 but held only by the downstream side roller pair 141. Thus, it is likely that the partial printing SP5 is performed with the sheet M being deformed and the hitting positions of the ink droplets are tend to vary easily. As a result, a length Hb, in the conveying direction AR, of the two-path area SA4 printed by the partial printing SP5 and the previous partial printing SP4 is set to be longer than a length Ha, in the conveying direction AR, of any of the other path areas SA1-SA3. Accordingly, the color unevenness which could occur in the two-path area SA5 due to unevenness in hitting positions of the ink droplets can be suppressed. It is noted that, if the length, in the conveying direction AR, of the two-path area SAk is excessively elongated, the printing speed is lowered. Therefore, in order to suppress lowering of the printing speed, the lengths Ha, in the conveying direction AR, of the two-path areas SA1-SA3 are set to be shorter than the length Hb.

A printing direction of the partial printing SP is one of the two directions along the main scanning direction, a forward direction and a backward direction. That is, when the partial printing SP is performed, one of the forward path printing in which dots are formed with the print head 110 being moved in the forward direction (i.e., the X-axis positive direction in FIG. 4) and the backward path printing in which dots are formed with the print head 110 being moved in the backward direction (i.e., the X-axis negative direction in FIG. 4) is performed. In FIG. 4, within each of the partial printing areas, an arrow of a solid line directed to the X-axis positive direction or the X-axis negative direction is indicated. According to the present embodiment, the partial areas in which the arrows of solid lines directed to the X-axis positive direction (e.g., the partial areas RA1, RA3 and RA5 in FIG. 4) are forward path partial areas in which images are printed by the forward path printing. Further, the partial areas in which the arrows of solid lines directed to the X-axis negative direction (e.g., the partial areas RA2 and RA4 in FIG. 4) are backward path partial areas in which images are printed by the backward path printing.

As shown in FIG. 4, printing employed in the present embodiment is bidirectional printing in which the forward path printing and the backward path printing are alternately performed. According to the bidirectional printing, a time period necessary for printing can be shortened in comparison with a one-directional printing in which, for example, only the forward path printing is repeatedly performed. According to the one-directional printing, after the forward path printing is performed, the print head 110 must be moved in the backward path direction, without performing the partial printing, in order to prepare for the next forward printing. In contrast, according to the bidirectional printing, such a movement of the print head 110 without performing the partial printing is not necessary.

A-3. Color Conversion Process

Firstly, a plurality of profiles FP, RP, OP1 and OP2 (see FIG. 1) which are used in the color conversion process will be explained. As shown in FIG. 2B, four nozzle arrays NC, NM, NY and NK are formed such that positions thereof in the main scanning direction are different from each other. Accordingly, in order to form dots of four colors C, M, Y and K on the same position, in the main scanning direction, on the sheet M, orders of forming the dots of the four colors are different in the forward path printing and in the backward path printing.

In the example of FIG. 2B, dots are formed in the order of K, C, M and Y in the forward path printing, and dots are formed in the opposite order of Y, M, C and K in the backward path printing. As a result, in an area where a plurality of color of dos overlap, an overlapping order of the plurality of color dots are different in the forward path printing and in the backward path printing. Therefore, a partial image printed in the forward path printing and a partial image printed in the backward path printing may have different hues even if both partial images are printed based on the same dot data. Such a difference between the partial image printed in the forward path printing and the partial image printed in the backward path printing may also be referred to as a forward/backward paths color difference. It is noted that the forward/backward path color difference occurs between images printed in the one-path areas NA1, NA3 and NA5, which are printed in the forward path printing in FIG. 4 and the images in the one-path areas NA2 and NA4, which are printed in the backward path printing.

Further, each of the images printed in the two-path areas SA1-SA4 is formed by two partial printings SP. Therefore, in the image printed in each of the two-path areas SA1-SA4, the overlapping order of the plurality of color dots are different from that in the one-path areas NA1-NA5 in which each image is formed by one execution of the partial printing SP. As a result, a color difference could occur between the images formed in the two-path areas SA1-SA4 and the images formed in the one-path areas NA1-NA5.

Further, in the two-path areas SA1 and SA3, since the backward path printing is performed after the forward path printing, the ink dots are overlapped in the order of K, C, M, Y, Y, M, C and K. In contrast, in the two-path areas SA2 and SA4, since the forward path printing is performed after the backward path printing is performed, the ink dots are overlapped in the order of Y, M, C, K, K, C, M and Y. Therefore, images printed in the two-path areas SA1 and SA3 and images printed in the two-path areas SA2 and SA4 are formed such that the order of overlapped ink dots are different. Due to this difference, a color difference could occur between the images formed in the two-path areas SA1 and SA3, and the images formed in the two-path areas SA2 and SA4.

In order to suppress the color difference as mentioned above, the plurality of profiles FR, BR, OP1 and OP2 are used. The forward path profile FP is used to generate print data for the one-path area NA1 or NA3, that is, when print data representing an image to be printed, by the forward path printing, in the one-path area NA1 or NA3 is generated. The backward path profile RP is used to generate print data for the one-path area NA2 or NA4, that is, when print data representing an image to be printed, by the backward path printing, in the one-path area NA2 or NA4 is generated. The first overlap area (i.e., the two-path area) profile OP1 is used to generate print data for the two-path area SA1 or SA3, that is, when print data representing an image a part of which is to be printed by the forward path printing, and another part of which is to be printed by the backward path printing in the two-path area SA1 or SA3 is generated. The second overlap area (i.e., the two-path area) profile OP2 is used to generate print data for the two-path area SA2 or SA4, that is, when print data representing an image a part of which is to be printed by the backward path printing, and another part of which is to be printed by the forward path printing in the two-path area SA2 or SA4 is generated.

It is noted that the above-mentioned profiles FP, RP, OP1 and OP2 are configured such that the above-mentioned color differences are suppressed. Concretely, the profiles FP, RP, OP1 and OP2 are adjusted such that images printed in accordance with printing methods respectively corresponding to the profiles FP, RP, OP1 and OP2 based on the CMYK values which are obtained by converting particular RGB values with use of the provided FP, RP, OP1 and OP2 exhibit colors close to each other. It is noted that the profiles FP, RP, OP1 and/OP2 are adjusted by evaluating color differences among the printed images visually and/or by color measurement.

Hereinafter, the color conversion process (see S30 of FIG. 3) using the profiles FP, RP, OP1 and OP2 will be described.

Figure 5:
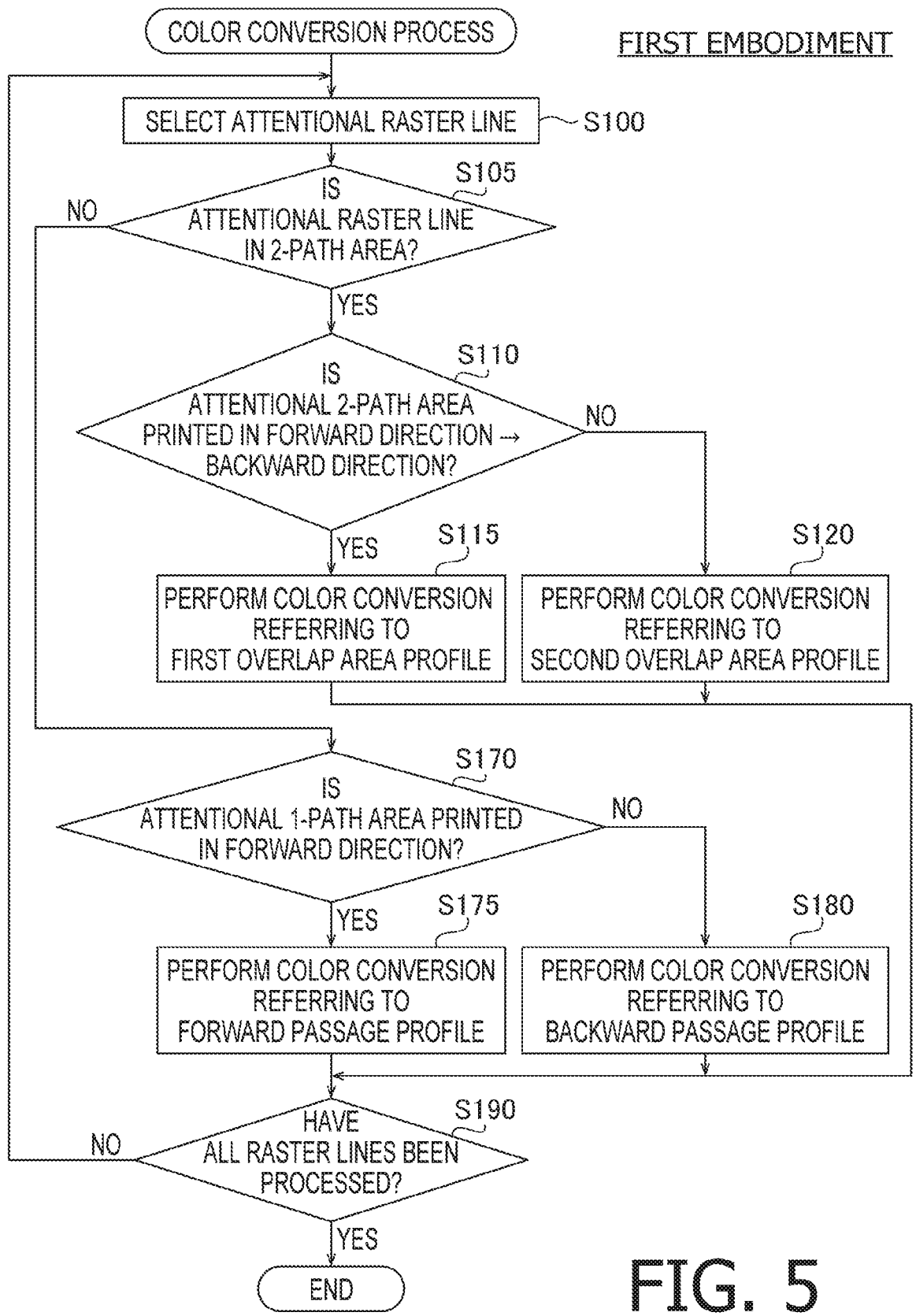
FIG. 5 is a flowchart illustrating a color conversion process according to a first embodiment of the present disclosures.

FIG. 5 shows a flowchart illustrating the color conversion process according to a first embodiment.

In S100, the CPU 310 selects an attentional raster line. It is noted that an RGB image RI represented by RGB image data which is subjected to the color conversion corresponds to the print image PI shown in FIG. 4. Therefore, it could be said that FIG. 4 is a drawing which shows the RGB image RI. The RGB image RI extends in the X-axis direction, which corresponds to the main scanning direction when printing is performed. The RGB image RI includes a plurality of raster lines RL of which position in the Y-axis direction are different from each other (e.g., a raster line RL1 in FIG. 4). Each raster line RL is a line extending in the X-axis direction in FIG. 4 and including a plurality of pixels. The CPU 310 is configured, for example, to sequentially select one attentional raster line from a side corresponding to the downstream side of the conveying direction AR from among the plurality of raster lines RL. For example, the firstly selected raster line may be the raster line RL1 shown in FIG. 4.

In S105, the CPU 310 determines whether the attentional raster line is within a two-path area. Since the RGB image RI corresponds to the print image PI, the one-path areas NA1-NA5 and the two-path areas SA1-SA4, which are defined with respect to the print image PI (see FIG. 4) can also be defined with respect to the RGB image RI.

When the attentional raster line 2 is located within the two-path area (S105: YES), the CPU 310 determines whether an image in the two-path area in which the attentional raster line is located (which area will also be referred to as an attentional two-path area) is printed by the backward path printing after printed by the forward path printing, or printed by the forward path printing after printed by the backward path printing (S110). For example, when the attentional raster line is located within the two-path area SA1 or SA3 of FIG. 4 (S110: YES), the CPU 310 determines that the image in the attentional two-path area is printed by the forward path printing and then by the backward path printing. When the attentional raster line is located within the two-path area SA2 or SA4 of FIG. 4 (S110: NO), the CPU 310 determines that the image in the attentional two-path area is printed by the backward path printing and then by the forward path printing.

When the image in the attentional two-path is printed by the forward path printing and then by the backward path printing (S110: YES), the CPU 310 applies the color conversion to data corresponding to the attentional raster line with reference to the profile OP1 for the first overlap area (S115). With this color conversion, the RGB values for the plurality of pixels included in the attentional raster line are converted to the CMYK values.

When the image in the attentional two-path is printed by the backward path printing and then by the forward path printing (S110: NO), the CPU 310 applies the color conversion to data corresponding to the attentional raster line with reference to the profile OP2 for the second overlap area (S120).

When the attentional raster line is not located within the two-path area (S105: NO), that is, when the attentional raster line is located within the one-path area, the CPU 310 determines whether the image within the one-path area in which the attentional raster line is located (which area will also be referred to as an attentional one-path area) is printed by the forward path printing or by the backward path printing (S170). When, for example, the attentional raster line is located within the one-path area NA1 or NA3 of FIG. 4 (S170: YES), the CPU 310 determines that the image in the attentional one-path area is printed by the forward path printing. When the attentional raster line located within the one-path area NA2 or NA4 of FIG. 4 (S170: NO), the CPU 310 determines that the image in the attentional one-path area is printed by the backward path printing.

When the image in the attentional one-path area is printed by the forward path printing (S170: YES), the CPU 310 applies the color conversion to data corresponding to the attentional raster data with reference to the profile FP for the forward path (S175).

When the image in the attentional one-path area is printed by the backward path printing (S170: NO), the CPU 310 applies the color conversion to data corresponding to the attentional raster data with reference to the profile RP for the backward path (S180).

In S190, the CPU 310 determines whether all the raster lines RL included in the RGB image RI have been processed. When it is determined that all the raster lines RL have been processed (S190: YES), the CPU 310 terminates the color conversion process. When there remains unprocessed raster lines (S190: NO), the CPU 310 returns to S100.

A-4. Path Data Outputting Process

Figure 6:
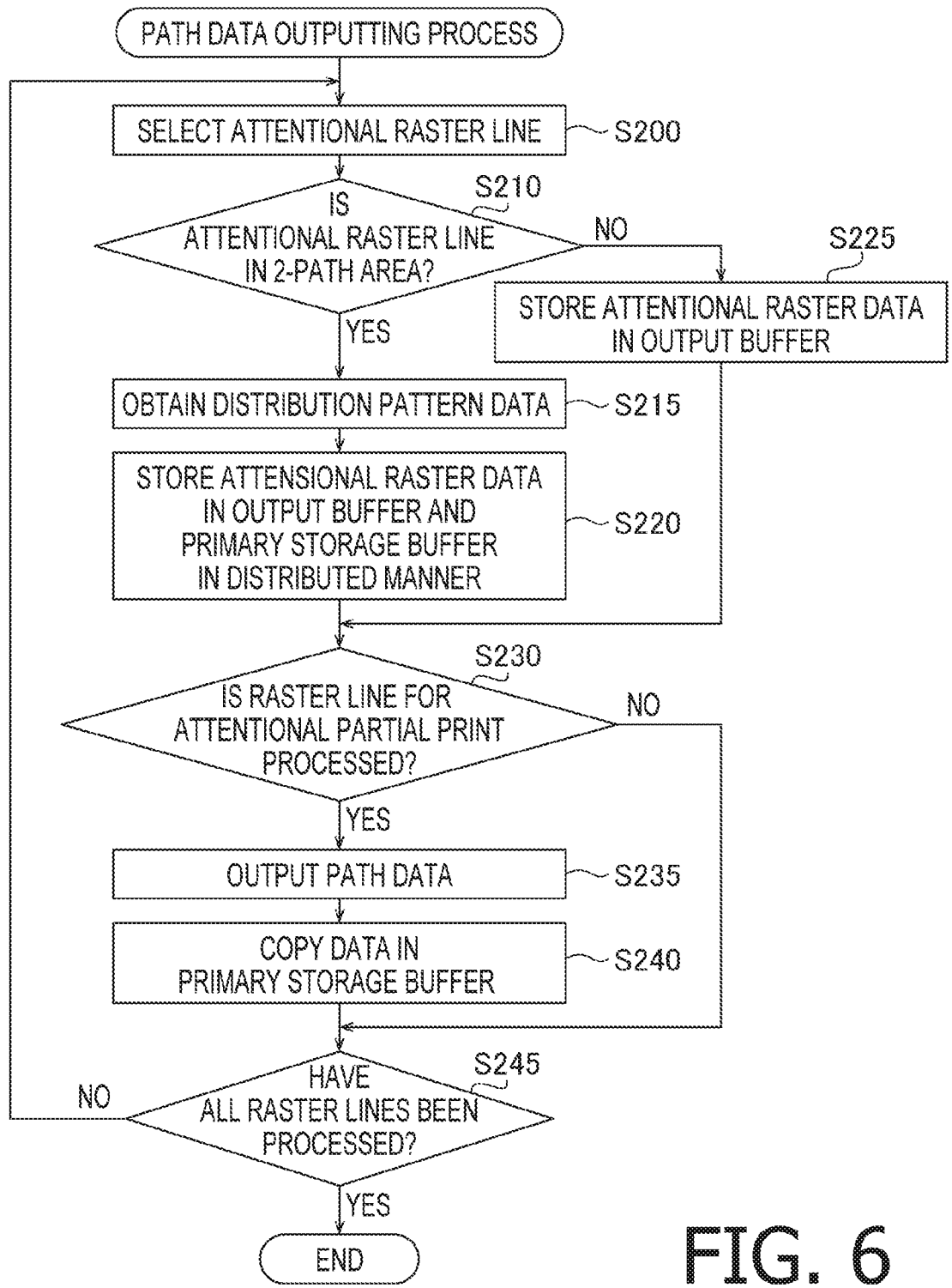
FIG. 6 is a flowchart illustrating a path data outputting process according to the present disclosures.

Next, the path data outputting process, which is performed in S30 of FIG. 3, will be described. FIG. 6 shows a flowchart illustrating the path data outputting process. It is noted that the print image PI (see FIG. 4) indicated by dot data which is generated in the halftone process (S40 of FIG. 3) includes a plurality of raster lined RL, similarly to the RGB image RI.

In S200, the CPU 310 selects on attentional raster line from among the plurality of raster lines. The attentional raster line is sequentially selected, similarly to selection in the color conversion process, from the downstream side in the conveying direction AR (i.e., from the Y-axis positive side in FIG. 4). In the following description, the partial printing SP of printing the attentional raster line will also be referred to as attentional partial printing. It is noted that the attentional raster line is printed by two executions of the partial printing SP, that is, the attentional raster line is located within the two-path area, a firstly executed partial printing of two executions of partial printing is referred to the attentional partial printing. For example, when the raster lines RL1 and RL2 in FIG. 4 are the attentional raster lines, the attentional partial printing is the partial printing SP1 performed at a head position P1 (see FIG. 4).

In S210, the CPU 310 determines whether the attentional raster line is located within the two-path area.

When it is determined that the attentional raster line is located within the two-path area (S210: YES), the CPU 310 obtains distribution pattern data PD corresponding to the attentional raster line (S215). FIG. 7A shows an example of the distribution pattern data PD, and FIG. 7B shows a recording ratio of the partial printing at the head positions of P3-P5. As shown in FIG. 7A, the distribution pattern PD is binary data having a value corresponding to each pixel of the attentional raster line. A value "0" of the distribution pattern data PD indicates that the dot corresponding to the pixel should be formed by the attentional partial printing. A value "1" of the distribution pattern data PD indicates that the dot corresponding to the pixel is to be formed by the partial printing next to the attentional partial printing.

Recording rations R3, R4 and R5 shown in FIG. 7B are recording ratios in the partial printings SP3, SP4 and SP5 at the head positions P3, P4 and P5, respectively. It is noted that, in FIG. 7B, the recoding rations R3, R4 and R5 with respect to positions in the conveying direction AR are indicated. Within a range, in the conveying direction AR, corresponding to the one-path partial image NA3 (see FIG. 4), the recording ration R3 is 100%. Similarly, within the range, in the conveying direction AR, corresponding to the one-path partial images NA4 and NA5 (see FIG. 4), the recording rations R4 and R5 are both 100%.

Within a range, in the conveying direction AR, corresponding to the two-path partial image SA3 (see FIG. 4), the recording ratio R3 linearly decreases from the downstream side to the upstream side in the conveying direction AR (i.e., from the upside to the downside in FIG. 7B). In contrast, within the range, in the conveying direction AR, corresponding to the two-path partial image SA3 (see FIG. 4), the recording ratio R4 linearly decreases from the upstream side to the downstream side in the conveying direction AR (i.e., from the downside to the upside in FIG. 7B). It is noted that, within the range, in the conveying direction AR, corresponding to the two-path partial image SA3, a sum of the recording rations R3 and R4 is 100%. Such a relationship is held between the recording ratios R4 and R5 within the range, in the conveying direction AR, corresponding to the two-path partial image SA4.

In FIG. 7B, the recording rations for the partial printings corresponding to the head positions P3-P5 are shown. It is noted that the recording ratios are set similarly for other head positions P1 and P2. According to this configuration, each of the one-path partial images NA1-NA5 and two-path partial images SA1-SA4 at the recording ratio of 100%.

The distribution pattern data PD is generated depending on positions, in the conveying direction AR, within the overlapped position in which the two-path partial images are printed so that the above-described recording ratios are achieved.

In S220, the CPU 310 stores data corresponding to the attentional raster line (which data will also be referred to as attentional raster data) to be included in the dot data in an output buffer and a primary storage buffer in a distributed manner in accordance with the distribution pattern data PD. That is, in the attentional raster data, the data indicating dots which should be formed by the attentional partial printing is stored in the output buffer, and the data indicating dots which should be formed by the partial printing subsequent to the attentional partial printing is stored in the primary storage buffer.

When the attentional raster line is not located in the overlap area (S210: NO), all the dots corresponding to the plurality of pixels included in the attentional raster line should be formed by the attentional partial printing. Therefore, in this case, the CPU 310 stores, in the output buffer, the attentional raster data included in the dot data in S225.

In S230, the CPU 310 determines whether all the raster lines corresponding to the attentional partial printing has been processes as the attentional raster line. For example, in a case where the partial printing SP1, which is performed when the print head 110 is located at the head position P1 (see FIG. 4), is the attentional partial printing, when, from among a plurality of raster line RL corresponding to the head position P1, a raster line RL3 located at the most upstream side in the conveying direction AR is the attentional raster line, it is determined that the all the raster lines corresponding to the attentional partial printing have been processed.

When it is determined that all the raster lines corresponding to the attentional partial printing have been processed (S230: YES), the dot data corresponding to the attentional partial printing has been stored in the output buffer at this stage. Therefore, in such a case, the CPU 310 outputs the dot data corresponding to the attentional partial printing to the printing mechanism 100 as the path data in S235. When the path data is output, control data indicating a conveying amount of the sheet conveyance T to be performed after the attentional partial printing is added to the path data.

As an example, it is assumed that the attentional partial printing is the partial printing SP1. In this case, a length, in the conveying direction AR, of the two-path area SA1 on the upstream side within the partial area RA1 printed by the partial printing SP1 is Ha (see FIG. 4). Therefore, the conveying amount of the sheet conveyed by the sheet conveyance T after the attentional partial printing is D-Ha, which is calculated by subtracting the length Ha from the nozzle length D.

In S240, the CPU 310 deletes the path data which has been output from the output buffer, and copies the data stored in the primary storage buffer to the output buffer. For example, at a time when the last raster line corresponding to the head position P1 (see FIG. 4) has been processed, among a plurality of raster lines corresponding to the head position P2, the raster lines within the overlap area in which the two-path partial image SA1 is printed have been processed. Further, in the raster data corresponding to the processed raster lines, data to be used by the partial printing SP2 which is performed at the head position P2 has already been stored in the primary storage buffer. In S240, such data in the primary storage buffer is copied to the output buffer.

When there remains a non-processed raster line corresponding to the attentional partial printing (S320: NO), the CPU 310 skips S235 and S240.

In S245, the CPU 310 determines whether all the raster lines within the print image PI have been processed as attentional raster lines. When there remains a non-processed raster line (S245: NO), the CPU 310 returns to S200 and selects the non-processed raster line as the attentional raster line. When it is determined that all the raster lines have been processed (S245: YES), the CPU 310 terminates the path data outputting process.

According to the above-described embodiment, in the non-volatile storage 320, which is an example of a storage, the forward path profile FP corresponding to the forward path direction and the backward path profile RP corresponding to the backward path direction, which is opposite to the forward path direction, are stored. The CPU 310, when serving as an image obtaining device, obtains the RGB image data including the RGB values as target image data (see S10 and S20 of FIG. 3).

The CPU 310, when serving as an image data generating device, generates, with use of the RGB image data, a plurality of pieces of path data including path data for an N-th partial printing SP which is performed in the forward path direction (e.g., the first partial printing in the example shown in FIG. 4), which will also be referred to as parting printing data, and path data for an (N−1)-th partial printing SP which is performed in the backward path direction (e.g., the second partial printing in the example shown in FIG. 4) (see S30-S50 of FIG. 3).

The CPU 310 causes the printer 0200 to print the print image PI by causing the printer to perform the plurality of partial printings SP including the N-th partial printing SP and the (N+1)-th partial printing SP using the plurality of pieces of path data. In this process, the CPU 310 serves as an example of a print controller and the printer 200 serves as an example of the printing execution device.

An area which is printed by the N-th partial printing SP (e.g., the partial area RA1 in FIG. 4) includes a first overlap area (e.g., the two-path area SA1 in FIG. 4) in which the dots are formed by both the N-th partial printing SP and the (N+1)-th partial printing SP, and a first non-overlap area (e.g., the one-path area NA1 in FIG. 4) which is on the downstream side with respect to the first overlap area.

The first non-overlap area is an area in which the dots are formed by the N-th partial printing SP and no dots are formed by the (N+1)-th partial printing SP. The area in which printing is performed by the (N+1)-th partial printing (e.g., the partial area RA2 in FIG. 4) includes the first overlap area (e.g., the two-path area SA1 in FIG. 4) and the second non-overlap area (e.g., the one-path area NA2 in FIG. 4) on the upstream side with respect to the first overlap area. The second overlap area is an area in which no dots are formed by the N-th partial printing SP, while dots are formed by the (N+1)-th partial printing SP.

The color conversion process in S30 of FIG. 4 includes a first converting process (S175 of FIG. 5), which is applied to data corresponding to the first non-overlap area (e.g., the one-path area NA1 in FIG. 4) and is performed with reference to the forward path profile FP. The color conversion process further includes a second converting process (S180 in FIG. 5), which is applied to data included in the RGB image data and corresponding to the second non-overlap area (e.g., the one-path area NA2 in FIG. 4) and is performed with reference to the backward path profile RP.

The color conversion process further includes a third converting process (S115 in FIG. 5), which is a process applied to data included in the RGB image data and corresponding to the first overlap area (e.g., the two-path area SA1 in FIG. 4) and is different from the first converting process or the second converting process.

According to the above configuration, in the bidirectional printing including the N-th partial printing performed in the forward path direction and the (N+1)-th partial printing performed in the backward path direction, the color conversion process includes the third converting process to be applied to the data corresponding to the first overlap area, the image within the first overlap area is printed in appropriate colors. Therefore, according to the above-described configuration, the color irregularity between the image in the first overlap area (e.g., the two-path area SA1 in FIG. 4) and the images next to the first overlap areas (e.g., the one-path areas NA1 and NA2 in FIG. 4) can be suppressed.

Further, according to the present embodiment, the first overlap area profile OP1 is stored in the non-volatile storage 320 which is an example of a storage. The third converting process (i.e., S115 in FIG. 5) is performed with reference to the first overlap area profile OP1. Therefore, the color conversion of the data corresponding to the first overlap area (e.g., the two-path area SA1 in FIG. 4) can be performed appropriately.

According to the present embodiment, the second overlap area profile OP2 is stored in the non-volatile memory 320 which is the example of the storage.

The CPU 310, which serves as an example of a print data generating device, generates the partial printing data which includes partial printing data for the (N+2)-th partial printing SP (e.g., the third partial printing, in the example shown in FIG. 4) in S30-S50 of FIG. 3.

The CPU 310, when serving as the print controller, causes the printing execution device to perform a plurality of times of partial printings SP which include (N+2)-th partial printing SP. In an area in which printing is performed by the (N+2)-th partial printing SP (e.g., the partial area RA3 in FIG. 4) includes the second overlap area (e.g., the two-path area SA3 in FIG. 4) in which the dots are formed by the (N+1)-th partial printing SP and by the (N+2)-th partial area SP, and a third non-overlap area which is located on the upstream side with respect to the second overlap area. The third non-overlap area is an area in which dots are formed by the (N+2)-th partial printing SP and no dots are formed by the (N+1)-th partial printing SP. It is noted that, with respect to data included in the RGB image data and corresponding to the third non-overlap area, the first converting process (i.e., S175 in FIG. 5) is applied in the color conversion process (S30 of FIG. 3).

The color conversion process further includes a fourth converting process, which is applied to data included in the RGB image data and corresponding to the second overlap area and performed with reference to the second overlap area profile OP2. As a result, with respect to the first overlap area in which the partial printing SP in the forward path direction is firstly performed, and the second overlap area in which the partial printing SP in the backward direction is firstly performed, the color conversion is performed with reference profiles which area different from each other. Accordingly, the color conversion can be performed more appropriately with respect to the data corresponding to the first overlap area and the data corresponding to the second overlap area.

B. Second Embodiment

In a second embodiment, the color conversion process is different from that in the first embodiment. FIG. 8 shows a flowchart illustrating the color conversion process according to the second embodiment and FIG. 9 illustrates the color conversion process according to the second embodiment. It is noted that, in the second embodiment, the first overlap area profile OP1 and the second overlap area profile OP2 (see FIG. 1) are not used. Therefore, according to the second embodiment, the first and second overlap area profiles OP1 and OP2 need not be stored in the volatile storage 230. Further, according to the second embodiment, S110-S120 of FIG. 5 are replaced with S110B-S120B in FIG. 8. The other steps in FIG. 8 which are similar to those in FIG. 5 are assigned with the same step numbers.

In S110B, the CPU 310 determines whether the attentional raster line within the two-path area is closer to the one-path area printed by the forward path printing than the one-path area printed by the backward path printing.

For example, in the two-path area SA3 shown in FIG. 9, when the attentional raster line is located within a downstream portion SA3b which is a portion on the downstream side (i.e., the Y-axis positive side) with respect to the center of the two-path area SA3 in the conveying direction AR, it is determined that the attentional raster line is closer to the one-path area NA3 in which the forward path printing is performed than the one-path area NA4 in which the backward path printing is performed.

When, for example, the attentional raster line is located within an upstream portion SA3a which is a portion on the upstream side (i.e., the Y-axis negative side) with respect to the center of the two-path area SA3 in the conveying direction AR, it is determined that the attentional raster line is closer to the one-path area NA4 in which the backward path printing is performed than the one-path area NA3 in which the forward path printing is performed.

Similarly, when the attentional raster line is located on the downstream portion SA4b of the two-path area SA4 in FIG. 9, it is determined that the attentional raster line is closer to a one-path area NA4 in which the backward path printing is performed than the one-path area NA5 in which the forward path printing is performed.

When the attentional raster line is located within an upstream portion SA4a of the two-path area SA4 in FIG. 9, it is determined that the attentional raster line is closer to a one-path area NA5 in which the forward path printing is performed than the one-path area NA4 in which the backward path printing is performed.

When the attentional raster line is closer to the one-path area in which the forward path printing is performed than the one-path area in which the backward path printing is performed (S110B: YES), the CPU 310 applies the color conversion to the data corresponding to the attentional raster line with reference to the forward path profile FP in S115.

When the attentional raster line is closer to the one-path area in which the backward path printing is performed than the one-path area in which the forward path printing is performed (S110B: NO), the CPU 310 applies the color conversion to the data corresponding to the attentional raster line with reference to the backward path profile FP in S120.

According to the above-described second embodiment, the color conversion process applied to the data included in the RGB image data and corresponding to, for example, two-path areas SA3 and SA4 in FIG. 9 includes an upstream converting process and a downstream converting process. The upstream converting process is applied to the data corresponding to the upstream portions SA3a and SA4a which include upstream ends, in the conveying direction AR (i.e., the sub scanning direction), of the two-path areas SA3 and SA4, respectively. The downstream converting process is applied to the data corresponding to the downstream portions SA3b and SA4b which include downstream ends, in the conveying direction AR (i.e., the sub scanning direction), of the two-path areas SA3 and SA4, respectively.

The upstream converting process to be applied to the upstream portion SA3a is performed with reference to the backward path profile RP which is used for the color conversion of the data corresponding to the one-path area NA4, in which the backward path printing is performed, the one-path area NA4 being located on the upstream side with respect to the two-path area SA3. The upstream converting process to be applied to the upstream portion SA4a is performed with reference to the forward path profile FP which is used for the color conversion of the data corresponding to the one-path area NA5, in which the forward path printing is performed, the one-path area NA5 being located on the upstream side with respect to the two-path area SA4.

The downstream converting process to be applied to the downstream portion SA3b is performed with reference to the forward path profile FP which is used for color conversion of the data corresponding to the one-path area NA3, in which the forward path printing is performed, the one-path area NA3 being located on the downstream side with respect to the two-path area SA3. The downstream converting process to be applied to the downstream portion SA4b is performed with reference to the backward path profile RP which is used for color conversion of the data corresponding to the one-path area NA4, in which the backward path printing is performed, the one-path area NA4 being located on the downstream side with respect to the two-path area SA4.

As a result, the color conversion of the data included in the data corresponding to the two-path areas and corresponding to the upstream portions SA3a and SA4a and the downstream portions SA3b and SA4b is performed with reference to the profiles which are used for the color conversion process for the data corresponding to the one-path areas next to the upstream portions SA3a and SA4a and the downstream portions SA3b and SA4b, respectively. Accordingly, the color irregularity between images within the two-path areas (e.g., the two-path areas SA3 and SA4 in FIG. 9) and images next to the two-path areas (e.g., images in the one-path areas NA3, NA4 and NA5 in FIG. 9) can be suppressed.

According to the present embodiment, as described above with reference to FIG. 7B, in the plurality of raster lines within the two-path area (e.g., the area SA3), percentage of the pixels assigned to the partial printing SP executed earlier (e.g., the third partial printing SP3) is higher as the position, in the conveying direction AR, is closer to the downstream end, while percentage of the pixel assigned to the partial printing SP executed later (e.g., the fourth partial printing SP4) is higher as the position, in the conveying direction AR, is closer to the upper end.

Further, as is understood from FIGS. 7B and 9, the downstream portion (e.g., the area SA3b) of the two-path area (e.g., the area SA3) is a portion in which percentage of the pixels (i.e., the recording ratio), in each raster line, assigned to the partial printing SP which is executed firstly is equal to or greater than ½ (i.e., 50%). The upstream portion (e.g., the area SA3a) of the two-path area (e.g., the area SA3) is a portion in which percentage of the pixels (i.e., the recording ratio), in each raster line, assigned to the partial printing SP which is executed secondly is equal to or greater than ½ (i.e., 50%).

As a result, printing of the downstream portion (e.g., the area SA3b) in which percentage of the pixels assigned to the partial printing SP executed firstly is equal to or greater than ½ is performed with reference to the profile (e.g., the forward path profile FP) corresponding to the printing direction (e.g., the forward direction) of the partial printing SP executed firstly.

Further, printing of the downstream portion (e.g., the area SA3a) in which percentage of the pixels assigned to the partial printing SP executed secondly is equal to or greater than ½ is performed with reference to the profile (e.g., the backward path profile RP) corresponding to the printing direction (e.g., the backward direction) of the partial printing SP executed secondly.

As a result, data conversion of the data corresponding to the upstream portion and the downstream portion can be performed appropriately.

As is understood from the description above, in the second embodiment, the two-path areas SA3 and SA4 shown in FIG. 9 are examples of the first overlap area. When the two-path area SA3 in FIG. 9 corresponds to the first overlap area, the forward path profile FP is an example of the first profile and the backward path profile RP is an example of the second profile. When the two-path area SA4 in FIG. 9 corresponds to the first overlap area, the forward path profile FP is an example of the second profile and the backward path profile RP is an example of the first profile.

C. Third Embodiment

The color conversion according to the third embodiment is different from those according to the first and second embodiments. FIG. 10 shows a flowchart illustrating the color conversion process according to the third embodiment. In the third embodiment, as in the second embodiment, the first overlap area profile OP1 or the second overlap area profile OP2 is not used. Therefore, the first and second overlap profiles OP1 and OP2 need not be stored in the volatile storage 230. In the color conversion process shown in FIG. 10, steps S110-S120 of the color conversion process shown in FIG. 5 are replaced with steps S110C-S120C. The other steps in FIG. 10 are the same as those in FIG. 5 and are assigned with the same step numbers.

In S110C, the CPU 310 obtains the recording ratios of the two partial printings SP (i.e., the forward path printing and the backward path printing) to print images within the two-path area in which the attentional raster line is located. As shown in FIG. 7, the recording ratio is determined based on the position of the attentional raster line in the conveying direction AR. For example, when the N-th partial printing is the attentional partial printing, the recording ratio of the N-th partial printing SPn and the recording ratio of the (N+1)-th partial printing SPn are obtained. One of the recording ratio of the N-th partial printing SPn and the recording ratio of the (N+1)-th partial printing SPn is the forward path printing and the other is the backward printing. In the following description, the recording ratio of the forward path printing will be indicated by Rf, and the recording ratio of the backward path printing will be indicated by Rr.

In S115C, the CPU 310 converts the data corresponding to the attentional raster data to a synthesized value of a converted value from the forward path profile FP and a converted value from the backward path profile RP. For example, the CPU 310 refers to the forward path profile FP and converts the RGB values of each pixel of the attentional raster line to corresponding CMYK values, which will also be referred to as Cf value, Mf value, Yf value and Kf value.

Further, the CPU 310 refers to the backward path profile FP and converts the RGB values of each pixel of the attentional raster line to corresponding CMYK values, which will also be referred to as Cr value, Mr value, Yr value and Kr value. Then, using the two sets of CMYK values and the recording ratios Rf and Rr, the CPU 310 converts the RGB values of each pixel of the attentional raster line to the synthesized CMYK value, which will be indicated as Cm, Mm, Ym and Km.

The synthesized CMYK values (i.e., Cm, Mm, Ym and Km) are obtained based on formulas indicated below.

$$Cm = (Rf \times Cr) + (Rr \times Cr)$$

$$Mm = (Rf \times Mr) + (Rr \times Mr)$$

$$Ym = (Rf \times Yr) + (Rr \times Yr)$$

$$Km = (Rf \times Kr) + (Rr \times Kr) \qquad (1)$$

According to the third embodiment described above, the color conversion process applied to data included in the RGB data and corresponding to the two-path area includes a process of converting the RGB values to the synthesized CMYK values (see S120C of FIG. 10). The synthesized CMYK values are color values obtained by synthesizing the CMYK values (i.e., Cf, Mf, Yf and Kf) which are identified by referring to the forward path profile FP and the CMYK values (i.e., Cr, Mr, Yr and Kr) which are identified by referring to the backward path profile RP, in accordance with ratios (i.e., Rf and Rr) of the pixels assigned to the N-th partial printing SP so the pixel assigned to the (N+1)-th partial printing (see above formulas (1), S110C and S120C of FIG. 10). As a result, the data corresponding to the two-path area can be converted appropriately.

It is noted that, with regard to the two partial printings SP, when the recording ratio Rf of the forward path printing is higher, the color of the printed image is closer to that when the image is printed by the forward path printing. When the recording ratio Rr of the backward path printing is higher, the color of the printing image is closer to that when the image is printed by the backward path printing.

In view of the above, according to the present embodiment, as indicated by the formulas (1), the synthesized CMYK values are determined such that when the recording ratio Rf is higher, contribution of the forward path profile FP is higher, and when the recording ratio Rr is higher, contribution of the backward path profile RP is higher.

As a result, the color irregularity between the image in the two-path area and the images in the one-path area next thereto and within the one-path area NA printed by the backward path printing can be suppressed.

Further, according to the present embodiment, as explained with reference to FIG. 7B, in the plurality of raster lines within the two-path area (e.g., the area SA3), the recording ratio Rf of the forward path printing (e.g., the third partial printing SP3) is higher as the position thereof in the conveying direction AR is closer to the one-path area (e.g., the area NA3) printed by the backward path printing, and the recording ratio Rr of the backward printing (e.g., the fourth partial printing SP4) is higher as the location in the conveying direction AR is closer to the one-path area (e.g., the area NA4) printed by the backward path printing.

According to the present embodiment, the synthesized CMYK values according to the synthesized ratios (i.e., the recording ratios Rf and Rr) which are different depending on the locations in the conveying direction AR. As a result, the color conversion of the data corresponding to the two-path area can be performed further appropriately.

Further, according to the present embodiment, for each of the two-path areas SA1-SA3 of which the length in the conveying direction AR is Ha, and for the two-path area SA4 of which the length in the conveying direction is Hb which is longer than Ha, different color conversions are performed. As a result, the color conversion of the data corresponding to the two-path areas SA1-SA3 and the color conversion of the data corresponding to the two-path area SA4 can be performed appropriately.

It could be said that each of the two-path areas SA1-SA3 of which length in the conveying direction is AR is an area containing K (k being an integer one or more) raster lines RL, and the two-path area SA4 of which length in the conveying direction AR is Hb is an area containing L (L being an integer greater than K) raster lines RL.

In other words, the color conversion of the data corresponding to the two-path areas SA1-SA3 is a first synthesizing conversion process to convert the RGB values to first synthesized CMYK values for each of the K raster lines and the color conversion of the data corresponding to the two-path area SA4 is a second synthesizing conversion process to convert the RGB values of second synthesized CMYK values for each of the L raster lines.

The first synthesized CMYK values are CMYK values obtained, for each of the K raster lines RL, based on first ratios (i.e., the recording ratios Rf and Rr) which are different depending on the position in the conveying direction, and the second synthesized CMYK values are CMYK values obtained, for each of the L raster lines RL, based on second ratios (i.e., recording ratios Rf and Rr) which are different depending on the position in the conveying direction AR. Accordingly, the color conversion of the data corresponding to the two-path areas SA1-SA3 and the data corresponding to the two-path area SA4 can be performed appropriately in accordance with the recoding ratios.

D. Fourth Embodiment

The color conversion process according to a fourth embodiment is different from the color conversion processes according to the first-third embodiment. In the fourth embodiment, one overlap area profile (not shown) is stored in the volatile storage 230 instead of the first overlap area profile OP1 and the second overlap area profile OP2 (see FIG. 1). The one overlap area profile may be, for example, one of the first overlap area profile OP1 and the second overlap area profile OP2 mentioned above, or one different from them. In the color conversion process shown in FIG. 11, S110-S120 of FIG. 5 are replaced with S110D-S120D. The other steps shown in FIG. 11 same as those in FIG. 5 are assigned with the same step numbers and description thereof will be omitted. It should be noted that S170-S180 in FIG. 5 are indicated as S170D and detailed description will be omitted.

In S110D, the CPU 310 determines whether a length, in the conveying direction AR, of the attentional two-path area within which the attentional raster line is located is equal to or greater than a reference length. For example, when the attentional two-path area is one of the two-path areas SA1-SA3 shown in FIG. 4, it is determined that the length, in the conveying direction AR, of the attentional two-path area is less than the reference length. When the attentional two-path area is the two-path area SA4 shown in FIG. 4, it is determined that the length, in the conveying direction AR, of it is determined that the attentional two-path area is equal to or greater than the reference length.

When the length, in the conveying direction AR, of the attentional two-path area is equal to or greater than the reference length (S110D: YES), the CPU 310 performs the color conversion of the data corresponding to the attentional raster line with reference to the overlap area profile in S115D. When it is determined that the length, in the conveying direction AR, of the attentional two-path area is less than the reference length (S110D: NO), the CPU 310 determines, as in S110B in FIG. 8, whether the attentional raster line within the two-path area is closer to the one-path area in which the forward path printing is performed than the one-path area in which the backward path printing is performed in S120D.

When it is determined that the attentional raster line is closer to the one-path area in which the forward path printing is performed that the one-path area in which the backward path printing is performed (S120D: YES), the CPU 310 performs the color conversion of the data corresponding to the attentional raster line with reference to the forward path profile FP in S125D.

When it is determined that the attentional raster line is closer to the one-path area in which the backward path printing is performed than the one-path area in which the forward path printing is performed (S120D: NO), the CPU 310 performs the color conversion of the data corresponding to the attentional raster line with reference to the backward path profile RP.

According to the fourth embodiment described above, similar to the third embodiment, the color conversion to be performed for the two-path areas SA1-SA3 of which length, in the conveying direction AR, is Ha and the color conversion to be performed for the two-path area SA4 of which length, in the conveying direction AR, is Hb which is longer than Ha are different from each other. Accordingly, the color conversion of the data corresponding to one of the two-path areas SA1-SA3 and the color conversion of the data corresponding to the two-path area SA4 can be performed appropriately.

Concretely, the present embodiment is different from the third embodiment. According to the present embodiment, for the data corresponding to the two-path areas SA1-SA3 of which length, in the conveying direction is Ha, the color conversion process same as that in the second embodiment (see FIG. 8) (see S120D-S130D in FIG. 11).

For example, for the upstream portion SA3*a* of the two-path area SA3 (see FIG. 9), the color conversion is performed, as in the second embodiment, with reference to the backward path profile RP which is used for color conversion of the data corresponding to the upstream side one-path area NA4, in which the backward path printing is performed.

For the downstream side portion SA3*b* of the two-path area SA3 (see FIG. 9), the color conversion is performed, as in the second embodiment, with reference to the forward path profile FP which is used for the color conversion of the data corresponding to the downstream side one-path area NA3, in which the forward path printing is performed. For the data corresponding to the two-path area SA4 of which length, in the conveying direction AR, is HB, the color conversion is performed with reference to the overlap area profile which is different from the forward path profile FP or the backward path profile RP (S115D in FIG. 11).

According to the present embodiment, the color conversion of the data corresponding to the two-path areas SA1-SA4 and the color conversion of the data corresponding to the two-path area SA4 can be performed appropriately. For example, when the length, in the conveying direction AR, of the two-path area is relatively short, the color irregularity is not conspicuous. However, when the length, in the conveying direction AR, of the two-path area is relatively long, there may be a case where using a profile particularly dedicated to the two-path area is preferable. According to the present embodiment, the color irregularity can be appropriately suppressed in such a case.

E. Fifth Embodiment

The color conversion process in a fifth embodiment is different form the color conversion process of each of the first-fourth embodiments. FIG. 12 shows a flowchart illustrating the color conversion process according to the fifth embodiment. FIG. 13 illustrates the color conversion process according to the fifth embodiment. In the fifth embodiment, as in the fourth embodiment, a single overlap area profile is stored in the volatile storage 230 instead of the first overlap area profile OP1 and the second overlap area profile OP2 (see FIG. 1). In the color conversion process shown in FIG. 12, S110-S120 in the color conversion process shown in FIG. 5 are replaced with S110E-S120E. The other steps shown in FIG. 12 same as those in FIG. 5 are assigned with the same step numbers and description thereof will be omitted. It should be noted that S170-S180 in FIG. 5 are indicated as S170E and detailed description will be omitted.

In S110E, the CPU 310 determines whether the attentional raster line is located at a central portion of the attentional two-path area. The two-path area SA3 in FIG. 13 includes a central portion SA3d, an upstream portion SA3c and a downstream portion SA3e. The central portion SA3d is a portion of a particular range, in the conveying direction AR, of the two-path area SA3 and includes the center, in the conveying direction AR, of the two-path area SA3. The upstream portion SA3c is arranged on the upstream side with respect to the central portion SA4d, and includes an upstream end of the two-path area SA3. The lower portion SA3e is arranged on the downstream side with respect to the central portion SA3d and includes a downstream end of the two-path area SA3. According to the present embodiment, the length, in the conveying direction AR, of each of the central portion SA3d, the upstream portion SA3c and the downstream portion SA3e is ⅓ of the length, in the conveying direction AR, of the two-path area SA3. The two-path area SA4 has the same configuration of the two-path area SA3 and also includes a central portion SA4d, an upstream portion SA4c and a downstream portion SA4e.

When the attentional raster line is located at the central portion of the attentional two-path area (S110E: YES), the CPU 310 performs the color conversion of the data corresponding to the attentional raster line with reference to the overlap area profile in S115E. When the attentional raster line is not located at the central portion of the attentional two-path area (S110E: NO), the CPU 310 determines whether the attentional raster line within the attentional two-path area is closer to the one-path area in which the forward path printing is performed than the one-path area in which the backward path printing is performed in S120E, as in S110B in FIG. 8.

When it is determined that the attentional raster line within the attentional two-path area is closer to the one-path area in which the forward path printing is performed than the one-path area in which the backward path printing is performed (S120E: YES), the CPU 310 performs the color conversion of the data corresponding to the attentional raster line with reference to the forward path profile FP in S125E.

When it is determined that the attentional raster line within the attentional two-path area is closer to the one-path area in which the backward path printing is performed than the one-path area in which the forward path printing is performed (S120E: NO), the CPU 310 performs the color conversion of the data corresponding to the attentional raster line with reference to the backward path profile FP in S130E.

According to the fifth embodiment described above, the color conversion process applied to the data corresponding to the two-path area (e.g., the two-path area SA3 in FIG. 13) includes a central portion converting process (e.g., S115E of FIG. 12) to be applied to the data corresponding to the central portion SA3d which is located between the upstream portion SA3c and the downstream portion SA3e. It is noted that the central portion converting process is a process different from the process (e.g., S120E-S130E) to be applied to the data corresponding to the upstream portion SA3c or the downstream portion SA3e. With this configuration, the color conversion of the data corresponding to the two-path area can be performed appropriately. Concretely, the central portion converting process is the color conversion process performed with reference to the overlap area profile (e.g., S115E of FIG. 12).

For example, the upstream portion SA3c is relatively close to the one-path area NA3 in which the forward path printing is performed as shown in FIG. 13. Therefore, the color conversion process with reference to the forward path profile FP is applied to the upstream portion SA3c, the color irregularity can be suppressed. In contrast, the downstream portion SA3e is relatively close to the one-path area NA4 in which the backward path printing is performed as shown in FIG. 13. Therefore, the color conversion process with reference to the backward path profile RP is applied to the downstream portion SA3e, the color irregularity can be suppressed.

Since the central portion SA3d is remote from both the one-path areas NA3 and NA4, regardless of whether the forward path profile FP or the backward path profile RP is referred to, the color irregularity could be conspicuous. According to the present embodiment, however, the color conversion is performed with reference to the dedicated overlap area profile, the color irregularity can be effectively suppressed. So are the other two-path areas (e.g., the two-path area SA4 in FIG. 13).

F. Sixth Embodiment

According to a fifth embodiment, concrete configurations of S110E and S115E are different from those according to the fifth embodiment, while the other configurations are the same as those of the fifth embodiment. Hereinafter, the sixth embodiment will be described, referring to, as in the fifth embodiment, FIGS. 7, 12 and 13.

In S110E, the CPU 310 determines whether the attentional raster line is located at a central portion of the attentional two-path area. The two-path area SA3 shown in FIG. 13 includes a central part SA3d, an upstream part SA3c and a downstream part SA3e. According to the sixth embodiment, as described above with reference to FIG. 7, according to the present embodiment, in the plurality of raster lines within the two-path area SA3, percentage of the pixels assigned to the partial printing SP3 which is performed firstly is higher as the location, in the conveying direction AR, is closer to the downstream end, and percentage of the pixels assigned to the partial printing SP4 which is performed secondly is higher as the location, in the conveying direction AR, is closer to the upstream end. Further, as is understood from FIG. 7, the downstream part SA3e of the two-path area SA3 is a portion in which the recording ratio of the firstly performed partial printing SP3 is equal to or greater than ⅔ in each raster line. Further, the upstream portion SA3c of the two-path area is a portion in which the recording ratio of the secondly performed partial printing SP3 is equal to or greater than ⅔ in each raster line. Further, the central part SA3d of the two-path area SA3 is a portion in which the recording ratio of the partial printings SP performed previously or subsequently is less than ⅔. That is, in S110E, the CPU 310 determines whether the recording ratio of the attentional raster line is less than ⅔ in the previously or subsequently performed partial printings SP.

When the attentional raster line is located at the central portion of the attentional two-path area (S110E: YES), that is, when it is determined that the recording ratio of the attentional raster line is less than ⅔ in the previously or subsequently performed partial printing SP, the CPU 310 performs the color conversion of the data corresponding to the attentional raster line with reference to the overlap area profile in S115E.

When the attentional raster line is not located at the central portion of the attentional two-path area (S110E: NO), that is, when the recording ratio of the attentional raster line in the previously or subsequently performed partial printing SP is equal to or greater than ⅔, the CPU 310 determines whether the attentional raster line within the attentional two-path area is closer to the one-path area in which the forward path printing is performed than the one-path area in which the backward path printing is performed in S120E, as in S110B in FIG. 8.

As a result, the color conversion of the downstream portion SA3e in which the recording ratio of the firstly performed partial printing SP is equal to or greater than ⅔ is performed with reference to the forward path profile FP which corresponds to the printing direction (i.e., the forward path direction) of the firstly performed partial printing SP. Further, the color conversion of the upstream portion SA3c in which the recording ratio of the secondly performed partial printing SP is equal to or greater than ⅔ is performed with reference to the backward path profile RP which corresponds to the printing direction (i.e., the backward path direction) of the secondly performed partial printing SP. As a result, the color conversion of the data corresponding to the upstream portion SA3c and the color conversion of the data corresponding to the downstream portion SA3e can be performed appropriately. So are the other two-path areas (e.g., the two-path area SA4 in FIG. 13).

G. Modifications (1) It is noted that the above-described embodiments are only examples and can be modified in various ways. For example, in the color conversion process applied to the upstream portions SA3c and SA4c and the downstream portions SA3e and the SA4e of the fifth embodiment, only one of the backward path profile RP and the forward path profile FP is referred to (see S120E-S130E of FIG. 12). Instead of the above, in the color conversion process applied to the upstream portions SA3c and SA4c and the downstream portions SA3e and the SA4e of the fifth embodiment, the color conversion process for the data corresponding to the two-path area of the third embodiment. That is, in the color conversion process applied to the upstream portions SA3c and SA4c and the downstream portions SA3e and the SA4e of the fifth embodiment, a process of converting the RGB values to the synthesized CMYK values with use of the two profiles FP and RP and the recording ratios Rf and Rr may be employed.

(2) In S115D of the fourth embodiment (see FIG. 11) or in S115E of the fifth embodiment (see FIG. 12), only a single overlap area profile is used. Instead of such a configuration, in S115D of the fourth embodiment (see FIG. 11) or in S115E of the fifth embodiment (see FIG. 12), as in the first embodiment, the two overlap are profiles OP1 and OP2 may be selectively used based on whether the attentional two-path area is an area in which the forward path printing is performed firstly, or the backward path printing is performed firstly. Further, in the first embodiment, two overlap area profiles OP1 and OP2 are selectively used (see S110-S120 of FIG. 1). Instead of such a configuration, only a single overlap area profile may be sued as in the fourth embodiment or the fifth embodiment.

(3) In each of the above-described embodiment, the two-path areas SA1-SA3 of which length, in the conveying direction AR, is Ha and the two-path area SA4 of which length, in the conveying direction AR, is Hb are defined. It is noted that the lengths, in the conveying direction AR, of the two-path areas SA1-SA4 may be the same.

(4) The recording ratios of the two-path areas in respective conveying directions linearly change from the upstream side to the downstream side. The recording ratios need not be configured as above. For example, within a range of the two-path area, the ratio Rf in the forward path direction and the ratio Rr in the backward path direction may be set to a unique value of ½ regardless of the conveying directions.

(5) According to the configuration shown in FIG. 2B, the nozzle rows NC, NM, NY and NK are arranged in this order from the upstream side to the downstream side in the X-axis direction as shown in FIG. 2B. However, according to a modification, the order of the nozzle rows NC, NM, NY and NK need not be limited to this order but any other arbitrary order may be employed.

(6) As a recording medium, instead of the sheet M, any other medium such as an OHP file, a CD-ROM, a DVD-ROM and the like may be employed.

(7) The printing mechanism 100 according to the above-described embodiment is configured such that the conveying device 140 conveys the sheet M, thereby the sheet M being moved relative to the print head 100. Instead of such a configuration, the print head 110 may be configured to move relative to the fixed M in a direction opposite to the conveying direction AR, which is the sheet conveying direction, so that the sheet M is moved relative to the print head 110 in the conveying direction AR.

(8) In each of the above-described embodiments, a device which performs the image processing shown in FIG. 3 is the terminal device 300. Instead of the terminal device 300, the CPU 210 of the printer 200 may be configured to perform the image processing shown in FIG. 3. In such a case, the CPU 210 serving as the image processing device outputs the path data, in S50 of FIG. 3, to a particular memory area of the non-volatile storage 220 or the volatile storage 230. The printing mechanism 100 may execute partial printing in accordance with the print data output by the CPU 210 and stored in the memory area.

As is understood from the foregoing, in each of the above-described embodiments, the terminal device 300 is an example of the image processing device and the printer 200 is an example of the printing execution device. Further, according to the modification described above, the CPU 210 of the printer 200 is an example of the image processing device and the printing mechanism 100 of the printer 100 is an example of the print execution device.

(9) A device performing the imaging process shown in FIG. 3 may be a server which is configured to obtain image data from the printer or a terminal device, and generate the print job using the thus obtained image data. Such a server may include a plurality of computers mutually communicable with each other through a network. In such a configuration, an entire configuration of the plurality of computers mutually communicable with each other through the network is an example of the image processing device.

(10) In each of the embodiments described above, a part of the configuration realized by hardware may be replaced with a configuration realized by software. Similarly, a part of or all of configuration realized by the software may be replaced with a configuration realized by the hardware. For example, when the image processing shown in FIG. 3 is performed by the printer 200, the halftone process in S40 or the path data outputting process in S50 may be realized, for example, by a dedicated hardware circuit (e.g., an ASIC) which operated in accordance with instructions issued by the CPU 210 of the printer 200.

The embodiments and modifications according to aspects of the present disclosures are described. It is noted that the above-described embodiments and modifications are only examples and provided to ease understanding of the present disclosures, but not intended to limit the aspects of the present disclosures. Various modifications and/or improvement can be made without departing of the aspects of the present disclosures.

What is claimed is:

1. An image processing apparatus configured to perform image processing for a printing execution device having a print head provided with first type of nozzles configured to eject first type of ink, second type of nozzles configured to eject second type of ink, the second type of nozzles being arranged at positions different, in a main scanning direction, from positions where the first type of nozzles are arranged, a main scanning device configured to perform main scanning to move the print head in the main scanning direction relative to a printing medium, a sub scanning device configured to perform sub scanning to move the printing medium relative to the print head in a sub scanning direction which intersects with the main scanning direction, the printing execution device being configured to perform printing by performing partial printing of forming dots on the print medium using the print head with performing the main scanning and the sub scanning a plurality of times, wherein the image processing apparatus comprises:
a storage configured to store a plurality of profiles each defining relationship between a first color value and a second color value, the second color value including component values corresponding to a plurality of types of ink including the first type of ink and the second type of ink, the plurality of profiles including a first profile corresponding to a first printing direction along the main scanning direction and a second profile corresponding to a second printing direction opposite to the first printing direction; and
a controller, the controller being configured to execute:
an image obtaining process for obtaining target image data including a plurality of the first color values respectively corresponding to a plurality of pixels;
a print data generating process for generating, using the target image data, a plurality of pieces of partial printing data including N-th partial printing data for an N-th partial printing performed in the first printing direction, N being an integer greater than zero, and (N+1)-th partial printing data for an (N+1)-th partial printing performed in the second printing direction; and
a print process for controlling the printing execution device to print a print image based on the target image data by causing the printing execution device to perform a plurality of times of the partial printing including the N-th partial printing and the (N+1)-th partial printing using the plurality of pieces of partial printing data,
wherein an area in which the N-th partial printing is performed includes:
a first overlap area in which dots are formed by both the N-th partial printing and the (N+1)-th partial printing; and
a first non-overlap area which is located on a downstream side, in the sub scanning direction, with respect to the first overlap area, the first non-overlap area being an area in which dots are formed by the N-th partial printing but no dots are formed by the (N+1)-th partial printing,
wherein an area in which the (N+1)-th partial printing is performed includes:
the first overlap area; and
a second non-overlap area which is located on an upstream side, in the sub scanning direction, with respect to the first overlap area, the second non-overlap area being an area in which no dots are formed by the N-th partial printing but dots are formed by the (N+1)-th partial printing, and
wherein the controller is configured to execute:
a first converting process to be applied to data included in the target image data and corresponding to the first non-overlap area, the first converting process converting each of the plurality of first color values to the second color values with reference to the first profile;
a second converting process to be applied to data included in the target image data and corresponding to the second non-overlap area, the second converting process converting each of the plurality of first color values to the second color values with reference to the second profile; and
a third converting process to be applied to data included in the target image data and corresponding to the first overlap area, the third converting process being different from the first converting process and the second converting process.

2. The image processing apparatus according to claim 1, wherein the third converting process includes:
an upstream converting process to be applied to data corresponding to an upstream portion, in the sub scanning direction, of the first overlap area, the upstream portion including an upstream end of the first overlap area, the upstream converting process being performed with reference to the second profile; and
a downstream converting process to be applied to data corresponding to a downstream portion, in the sub scanning direction, of the first overlap area, the downstream portion including a downstream end of the first overlap area, the downstream converting process being performed with reference to the first profile.

3. The image processing apparatus according to claim 2, wherein the third converting process further includes:

a central portion converting process to be applied to data corresponding to a central portion of the first overlap area, the central portion being arranged between the upstream portion and the downstream portion, the central portion converting process being different from both the upstream converting process and the downstream converting process.

4. The image processing apparatus according to claim 2, wherein the downstream portion is a portion in which the ratio of the pixels assigned with the N-th partial printing, in each raster line, is equal to or greater than a first threshold value, and
wherein the upstream portion is a portion in which the ratio of the pixels assigned with the (N+1)-th partial printing, in each raster line, is equal to or greater than a second threshold value.

5. The image processing apparatus according to claim 1, wherein the storage is configured to store a third profile which is different from both the first profile and the second profile, and
wherein, at least in a part of the third converting process, the controller converts each of the plurality of first color values to the second color values with reference to the third profile.

6. The image processing apparatus according to claim 5, wherein the storage is further configured to store a fourth profile which is different from any of the first profile, the second profile and the third profile,
wherein the controller generates the plurality of pieces of partial printing data which further contains (N+2)-th partial data to be used in (N+2)-th partial printing performed in the first printing direction, and
wherein the controller controls the printing execution device to perform a plurality of partial printings including the (N+2)-th partial printing to print the print image,
wherein an area in which the (N+2)-th partial printing is performed includes:
  a second overlap area in which dots are formed by both the (N+1)-th partial printing and the (N+2)-th partial printing; and
  a third non-overlap area which is arranged on the upstream side, in the sub scanning direction, with respect to the second overlap area, dots being formed in the third non-overlap area by the (N+2)-th partial printing and not dots being formed in the third non-overlap area by the (N+1)-th partial printing,
wherein the first converting process is performed for data included in the target image data and corresponding to the third non-overlap area, and
wherein the controller is configured to execute a fourth converting process to be applied to data included in the target image data and corresponding to at least a part of the second overlap area, the fourth converting process being performed with reference to the fourth profile.

7. The image processing apparatus according to claim 5, wherein the first overlap area includes a plurality of raster lines of which locations, in the sub scanning direction, are different from each other, each of the plurality of raster lines including multiple pixels aligned in the main scanning direction,
wherein, in each of the plurality of raster lines, a ratio of the pixels assigned with the N-th partial printing is higher as a location, in the sub scanning direction, closer to a downstream end, in the sub scanning direction, and a ratio of the pixels assigned with the (N+1)-th partial printing is higher as a location, in the sub scanning direction, is closer to an upstream end, in the sub scanning direction, and
wherein the synthesizing conversion process is a process of converting the first color values to the synthesized color values according to the ratios which are different depending on a position in the sub scanning direction.

8. The image processing apparatus according to claim 1, wherein each of multiple pixels to be formed within the first overlap area being assigned with one of the N-th partial printing and the (N+1)-th partial printing,
wherein the dots corresponding to the pixels assigned with the N-th partial printing are formed by the N-th partial printing and the dots corresponding to the pixels assigned with the (N+1)-th partial printing are formed by the (N+1)-th partial printing,
wherein the third converting process for at least a partial area of the first overlap area includes a synthesizing conversion process to convert the first color values to synthesized color values, and
wherein the synthesized color values are second color values by synthesizing the second color values identified with reference to the first profile and the second color values identified with reference to the second profile in accordance with a ratio between the pixels assigned with the N-th partial printing and the pixels assigned with the (N+1)-th partial printing.

9. The image processing apparatus according to claim 1, wherein the controller generates the plurality of pieces of partial printing data which further includes:
  M-th partial printing data for M-th partial printing to be performed in the first printing direction, M being an integer different from N; and
  (M+1)-th partial printing data for (M+1)-th partial printing to be performed in the second print direction,
wherein the controller causes the printing execution device to print the print image by causing the printing execution device to perform a plurality of times of partial printings including the M-th partial printing and the (M+1)-th partial printing,
  wherein an area in which the M-th partial printing is performed includes:
    a third overlap area in which dots are formed by both the M-th partial printing and the (M+1)-th partial printing, a length, in the sub scanning direction, of the third overlap area being longer than a length, in the sub scanning direction, of the first overlap area; and
    a fourth non-overlap area arranged on a downstream side, in the sub scanning direction, with respect to the third overlap area, dots are formed in the fourth non-overlap area by the M-th partial printing and no dots are formed in the fourth non-overlap area by the (M+1)-th partial printing,
  wherein an area in which the (M+1)-th partial printing is performed includes the third overlap area and a fifth non-overlap area arranged on an upstream side, in the sub scanning direction, with respect to the third overlap area, no dots being formed in the fifth non-overlap area by the M-th partial printing and dots being formed in the fifth non-overlap area by the (M+1)-th partial printing,
  wherein the first converting process is performed for data included in the target image data and corresponding to the fourth non-overlap area, wherein the second converting process is performed for data included in the target image data and corresponding to the fifth non-overlap area, and wherein a fifth converting process is performed for data included in the target image data and corresponding to the third overlap area, the fifth converting process is different from any of the first converting process, the second converting process and the third converting process.

10. The image processing apparatus according to claim 9, wherein the storage further stores a third profile which is different from both the first profile and the second profile, wherein the third converting process includes:
an upstream converting process to be performed for data corresponding to an upstream portion within the first overlap area and including an upstream end in the sub scanning direction, the upstream converting process being performed with reference to the second profile; and
a downstream converting process to be performed for data corresponding to a downstream portion within the first overlap area and including a downstream end in the sub scanning direction, the downstream converting process being performed with reference to the first profile, and wherein the fifth converting process is performed with reference to the third profile.

11. The image processing apparatus according to claim 10,
wherein the downstream portion is a portion in which the ratio of the pixels assigned with the N-th partial printing, in each raster line, is equal to or greater than a first threshold value, and
wherein the upstream portion is a portion in which the ratio of the pixels assigned with the (N+1)-th partial printing, in each raster line, is equal to or greater than a second threshold value.

12. The image processing apparatus according to claim 9,
wherein the first overlap area includes K raster lines, K being an integer equal to one or greater, the K raster lines being located at different positions in the sub scanning direction, each of the K raster lines including multiple pixels aligned in the main scanning direction,
wherein the third overlap area includes L raster lines, L being an integer equal to one or greater, the L raster lines being located at different positions in the sub scanning direction, each of the L raster lines including multiple pixels aligned in the main scanning direction,
wherein, in each of the K raster lines, a ratio of the pixels assigned with the N-th partial printing is higher as a location, in the sub scanning direction, is closer to a downstream end, in the sub scanning direction, and a ratio of the pixels assigned with the (N+1)-th partial printing is higher as a location, in the sub scanning direction, is closer to an upstream end, in the sub scanning direction,
wherein, in each of the L raster lines, a ratio of the pixels assigned with the M-th partial printing is higher as a location, in the sub scanning direction, is closer to a downstream end, in the sub scanning direction, and a ratio of the pixels assigned with the (M+1)-th partial printing is higher as a location, in the sub scanning direction, is closer to an upstream end, in the sub scanning direction, wherein the third converting process is a first synthesizing conversion process to convert, for each of the K raster lines, the first color values to first synthesized color values, wherein the fifth converting process is a second synthesizing conversion process to convert, for each of the L raster lines, the first color values to second synthesized color values, wherein the first synthesized color values are the second type color values obtained by synthesizing, in accordance with a first ratio, the second color values identified with reference to the first profile and the second color values identified with reference to the second profile, the first ratio being a ratio between the pixels assigned with the N-th partial printing and the pixels assigned with the (N+1)-th partial printing, and wherein the second synthesized color values are the second color values obtained by synthesizing, in accordance with a second ratio, the second color values identified with reference to the first profile and the second color values identified with reference to the second profile, the second ratio being a ratio between the pixels assigned with the M-th partial printing and the pixels assigned with the (M+1)-th partial printing.

13. A non-transitory computer-readable recording medium for an image processing apparatus which is configured to control a printing execution device having a print head provided with first type of nozzles configured to eject first type of ink, second type of nozzles configured to eject second type of ink, the second type of nozzles being arranged at positions different, in a main scanning direction, from positions where the first type of nozzles are arranged, a main scanning device configured to perform main scanning to move the print head in the main scanning direction relative to a printing medium, a sub scanning device configured to perform sub scanning to move the printing medium relative to the print head in a sub scanning direction which intersects with the main scanning direction, the printing execution device being configured to perform printing by performing partial printing of forming dots on the print medium using the print head with performing the main scanning and the sub scanning by a plurality of times, the recording medium storing instructions which cause, when executed by a controller of the image processing apparatus, the image processing apparatus to perform:

obtaining target image data including a plurality of the first color values respectively corresponding to a plurality of pixels;

generating, with use of the target image data, a plurality of pieces of partial printing data including N-th partial printing data for an N-th partial printing performed in a first printing direction, N being an integer greater than zero, and (N+1)-th partial printing data for an (N+1)-th partial printing performed in a second printing direction, the generating including a color conversion process of converting each of the plurality of first color values to the second color values;

controlling the printing execution device to print a print image based on the target image data by causing the printing execution device to perform a plurality of times of the partial printing including the N-th partial printing and the (N+1)-th partial printing using the plurality of pieces of partial printing data, wherein an area in which the N-th partial printing is performed includes:

a first overlap area in which dots are formed by both the N-th partial printing and the (N+1)-th partial printing; and a first non-overlap area which is located on a downstream side, in the sub scanning direction, with respect to the first overlap area, the first non-overlap area being an area in which dots are formed by the N-th partial printing but no dots are formed by the (N+1)-th partial printing, wherein an area in which the (N+1)-th partial printing is performed includes:

the first overlap area; and a second non-overlap area which is located on an upstream side, in the sub scanning direction, with respect to the first overlap area, the second non-overlap area being an area in which no dots are formed by the N-th partial printing but dots are formed by the (N+1)-th partial printing, and wherein the color conversion process includes:

a first converting process to be applied to data included in the target image data and corresponding to the first non-overlap area, the first converting process being performed with reference to a first profile;

a second converting process to be applied to data included in the target image data and corresponding to the second non-overlap area, the second converting process being performed with reference to a second profile; and a third converting process to be applied to data included in the target image data and corresponding to the first overlap area, the third converting process being different from the first converting process and the second converting process.

14. An image processing apparatus comprising:

a print head;

a carriage mounting the print head and configured to move the print head in a first direction relative to a printing medium;

a conveying device configured to move the printing medium relative to the print head in a second direction which intersects with the first direction;

a storage configured to store a first profile corresponding to the first direction and a second profile corresponding to a direction opposite to the first direction; and a controller, the controller being configured to execute:

generating, using target image data including a plurality of first color values respectively corresponding to a plurality of pixels, a plurality of pieces of partial printing data including N-th partial printing data for an N-th partial printing performed in the first direction, N being an integer greater than zero, and (N+1)-th partial printing data for an (N+1)-th partial printing performed in the direction opposite to the first direction;

printing, using the print head, in a first printing area based on the N-th partial printing data, the first printing area including a first overlap area and a first non-overlap area; and printing, using the printing head, in a second printing area based on the (N+1)-th partial printing data, the second printing area including the first overlap area and a second non-overlap area, and wherein the controller is configured to execute:

a first converting, at the first non-overlap area, each of the plurality of first type color values to a second type color values with reference to the first profile;

a second converting, at the second non-overlap area, each of the plurality of first color values to the second color values with reference to the second profile; and a third converting, at the first overlap area, each of the plurality of first color values to the second color values, the third converting being different from the first converting and the second converting.

15. The image processing apparatus according to claim 14, wherein the first overlap area is an area in which dots are formed by both the N-th partial printing and the (N+1)-th partial printing, wherein the first non-overlap area is an area which is not overlapped with the first overlap area in the second direction, the first non-overlap area being an area in which dots are formed by the N-th partial printing but no dots are formed by the (N+1)-th partial printing, and wherein the second non-overlap area is an area which is not overlapped with the first overlap area and the first non-overlap area in the second direction, the second non-overlap area being an area in which no dots are formed by the N-th partial printing but dots are formed by the (N+1)-th partial printing.

16. The image processing apparatus according to claim 14, wherein the first overlap area includes:

an upstream portion being arranged closer to the first non-overlap area than the second non-overlap area;

a downstream portion being arranged closer to the second non-overlap area than the first non-overlap area; and a central portion being arranged between the upstream portion and the downstream portion, wherein the controller is configured to execute the third converting, at least at the central portion, performed with reference to a third profile, and wherein the storage is configured to store the third profile which is different from both the first profile and the second profile.

17. The image processing apparatus according to claim 16, wherein the controller is configured to execute:

generating, using the target image data, (N+2)-th partial data to be used in (N+2)-th partial printing performed in the first direction; and printing, using the printing head, in a third printing area based on the (N+2)-th partial printing data, the third printing area including a second overlap area and a third non-overlap area, wherein the second overlap area is an area in which dots are formed by both the (N+1)-th partial printing and the (N+2)-th partial printing, wherein the third non-overlap area is an area which is not overlapped with the second overlap area in the second direction, the third non-overlap area being an area in which dots are formed by the (N+2)-th partial printing but no dots are formed by the (N+1)-th partial printing, wherein the controller is configured to execute a fourth converting, at the second overlap area, each of the plurality of first color values to the second color values with reference to a fourth profile, and wherein the storage is further configured to store the fourth profile which is different from any of the first profile, the second profile and the third profile.

18. The image processing apparatus according to claim 16, wherein the controller is configured to execute:
generating, using the target image data, (N+3)-th partial data to be used in (N+3)-th partial printing performed in the direction opposite to the first direction;
printing, using the printing head, in a fourth printing area based on the (N+3)-th partial printing data, the fourth printing area including a third overlap area and a fourth non-overlap area; and
a fifth converting, at the third overlap area, each of the plurality of first color values to the second color values with reference to the third profile.

19. The image processing apparatus according to claim 18, wherein a length of the third overlap area, in the second direction, is longer than a length of the first overlap area.

20. The image processing apparatus according to claim 19,
wherein the third overlap area is an area in which dots are formed by both the (N+2)-th partial printing and the (N+3)-th partial printing, and
wherein the fourth non-overlap area is an area which is not overlapped with the third overlap area in the second direction, the fourth non-overlap area being an area in which dots are formed by the (N+3)-th partial printing but no dots are formed by the (N+2)-th partial printing.

* * * * *

UNITED STATES PATENT AND TRADEMARK OFFICE
CERTIFICATE OF CORRECTION

| | |
|---|---|
| PATENT NO. | : 11,001,076 B2 |
| APPLICATION NO. | : 16/688335 |
| DATED | : November 19, 2019 |
| INVENTOR(S) | : Satoru Arakane |

It is certified that error appears in the above-identified patent and that said Letters Patent is hereby corrected as shown below:

In the Claims

Replace Column 27, Line 33-Column 35, Line 25, (approx.) with the following Claims:

1. An image processing apparatus configured to perform image processing for a printing execution device having a print head provided with first type of nozzles configured to eject first type of ink, second type of nozzles configured to eject second type of ink, the second type of nozzles being arranged at positions different, in a main scanning direction, from positions where the first type of nozzles are arranged, a main scanning device configured to perform main scanning to move the print head in the main scanning direction relative to a printing medium, a sub scanning device configured to perform sub scanning to move the printing medium relative to the print head in a sub scanning direction which intersects with the main scanning direction, the printing execution device being configured to perform printing by performing partial printing of forming dots on the print medium using the print head with performing the main scanning and the sub scanning a plurality of times, wherein the image processing apparatus comprises:
    a storage configured to store a plurality of profiles each defining relationship between a first color value and a second color value, the second color value including component values corresponding to a plurality of types of ink including the first type of ink and the second type of ink, the plurality of profiles including a first profile corresponding to a first printing direction along the main scanning direction and a second profile corresponding to a second printing direction opposite to the first printing direction; and
    a controller, the controller being configured to execute:
        an image obtaining process for obtaining target image data including a plurality of the first color values respectively corresponding to a plurality of pixels;
        a print data generating process for generating, using the target image data, a plurality of pieces of partial printing data including N-th partial printing data for an N-th partial printing performed in the first printing direction, N being an integer greater than zero, and (N+1)-th partial printing data for an (N+1)-th partial printing performed in the second printing direction; and
        a print process for controlling the printing execution device to print a print image Signed and Sealed this
Third Day of December, 2024

*Katherine Kelly Vidal*

Katherine Kelly Vidal
*Director of the United States Patent and Trademark Office* based on the target image data by causing the printing execution device to perform a plurality of times of the partial printing including the N-th partial printing and the (N+1)-th partial printing using the plurality of pieces of partial printing data,
    wherein an area in which the N-th partial printing is performed includes:
        a first overlap area in which dots are formed by both the N-th partial printing and the (N+1)-th partial printing; and
        a first non-overlap area which is located on a downstream side, in the sub scanning direction, with respect to the first overlap area, the first non-overlap area being an area in which dots are formed by the N-th partial printing but no dots are formed by the (N+1)-th partial printing,
    wherein an area in which the (N+1)-th partial printing is performed includes:
        the first overlap area; and
        a second non-overlap area which is located on an upstream side, in the sub scanning direction, with respect to the first overlap area, the second non-overlap area being an area in which no dots are formed by the N-th partial printing but dots are formed by the (N+1)-th partial printing, and
    wherein the controller is configured to execute:
        a first converting process to be applied to data included in the target image data and corresponding to the first non-overlap area, the first converting process converting each of the plurality of first color values to the second color values with reference to the first profile;
        a second converting process to be applied to data included in the target image data and corresponding to the second non-overlap area, the second converting process converting each of the plurality of first color values to the second color values with reference to the second profile; and
        a third converting process to be applied to data included in the target image data and corresponding to the first overlap area, the third converting process being different from the first converting process and the second converting process.

2. The image processing apparatus according to claim 1, wherein the third converting process includes:
    an upstream converting process to be applied to data corresponding to an upstream portion, in the sub scanning direction, of the first overlap area, the upstream portion including an upstream end of the first overlap area, the upstream converting process being performed with reference to the second profile; and
    a downstream converting process to be applied to data corresponding to a downstream portion, in the sub scanning direction, of the first overlap area, the downstream portion including a downstream end of the first overlap area, the downstream converting process being performed with reference to the first profile.

3. The image processing apparatus according to claim 2, wherein the third converting process further includes:
    a central portion converting process to be applied to data corresponding to a central portion of the first overlap area, the central portion being arranged between the upstream portion and the downstream portion, the central portion converting process being different from both the upstream converting process and the downstream converting process.

4. The image processing apparatus according to claim 2,
 wherein the downstream portion is a portion in which the ratio of the pixels assigned with the N-th partial printing, in each raster line, is equal to or greater than a first threshold value, and
 wherein the upstream portion is a portion in which the ratio of the pixels assigned with the (N+1)-th partial printing, in each raster line, is equal to or greater than a second threshold value.

5. The image processing apparatus according to claim 1,
 wherein the storage is configured to store a third profile which is different from both the first profile and the second profile, and
 wherein, at least in a part of the third converting process, the controller converts each of the plurality of first color values to the second color values with reference to the third profile.

6. The image processing apparatus according to claim 5,
 wherein the storage is further configured to store a fourth profile which is different from any of the first profile, the second profile and the third profile,
 wherein the controller generates the plurality of pieces of partial printing data which further contains (N+2)-th partial data to be used in (N+2)-th partial printing performed in the first printing direction, and
 wherein the controller controls the printing execution device to perform a plurality of partial printings including the (N+2)-th partial printing to print the print image, wherein an area in which the (N+2)-th partial printing is performed includes:
  a second overlap area in which dots are formed by both the (N+1)-th partial printing and the (N+2)-th partial printing; and
  a third non-overlap area which is arranged on the upstream side, in the sub scanning direction, with respect to the second overlap area, dots being formed in the third non-overlap area by the (N+2)-th partial printing and not dots being formed in the third non-overlap area by the (N+1)-th partial printing,
 wherein the first converting process is performed for data included in the target image data and corresponding to the third non-overlap area, and
 wherein the controller is configured to execute a fourth converting process to be applied to data included in the target image data and corresponding to at least a part of the second overlap area, the fourth converting process being performed with reference to the fourth profile.

7. The image processing apparatus according to claim 1,
 wherein each of multiple pixels to be formed within the first overlap area being assigned with one of the N-th partial printing and the (N+1)-th partial printing,
 wherein the dots corresponding to the pixels assigned with the N-th partial printing are formed by the N-th partial printing and the dots corresponding to the pixels assigned with the (N+1)-th partial printing are formed by the (N+1)-th partial printing,
 wherein the third converting process for at least a partial area of the first overlap area includes a synthesizing conversion process to convert the first color values to synthesized color values, and
 wherein the synthesized color values are second color values by synthesizing the second color values identified with reference to the first profile and the second color values identified with reference to the second profile in accordance with a ratio between the pixels assigned with the N-th partial printing and the pixels assigned with the (N+1)-th partial printing.

8. The image processing apparatus according to claim 7,
wherein the first overlap area includes a plurality of raster lines of which locations, in the sub scanning direction, are different from each other, each of the plurality of raster lines including multiple pixels aligned in the main scanning direction,
wherein, in each of the plurality of raster lines, a ratio of the pixels assigned with the N-th partial printing is higher as a location, in the sub scanning direction, is closer to a downstream end, in the sub scanning direction, and a ratio of the pixels assigned with the (N+1)-th partial printing is higher as a location, in the sub scanning direction, is closer to an upstream end, in the sub scanning direction, and
wherein the synthesizing conversion process is a process of converting the first color values to the synthesized color values according to the ratios which are different depending on a position in the sub scanning direction.

9. The image processing apparatus according to claim 1,
wherein the controller generates the plurality of pieces of partial printing data which further includes:
M-th partial printing data for M-th partial printing to be performed in the first printing direction, M being an integer different from N; and
(M+1)-th partial printing data for (M+1)-th partial printing to be performed in the second print direction,
wherein the controller causes the printing execution device to print the print image by causing the printing execution device to perform a plurality of times of partial printings including the M-th partial printing and the (M+1)-th partial printing,
wherein an area in which the M-th partial printing is performed includes:
a third overlap area in which dots are formed by both the M-th partial printing and the (M+1)-th partial printing, a length, in the sub scanning direction, of the third overlap area being longer than a length, in the sub scanning direction, of the first overlap area; and
a fourth non-overlap area arranged on a downstream side, in the sub scanning direction, with respect to the third overlap area, dots are formed in the fourth non-overlap area by the M-th partial printing and no dots are formed in the fourth non-overlap area by the (M+1)-th partial printing,
wherein an area in which the (M+1)-th partial printing is performed includes the third overlap area and a fifth non-overlap area arranged on an upstream side, in the sub scanning direction, with respect to the third overlap area, no dots being formed in the fifth non-overlap area by the M-th partial printing and dots being formed in the fifth non-overlap area by the (M+1)-th partial printing,
wherein the first converting process is performed for data included in the target image data and corresponding to the fourth non-overlap area,
wherein the second converting process is performed for data included in the target image data and corresponding to the fifth non-overlap area, and
wherein a fifth converting process is performed for data included in the target image data and corresponding to the third overlap area, the fifth converting process is different from any of the first converting process, the second converting process and the third converting process.

10. The image processing apparatus according to claim 9,
  wherein the storage further stores a third profile which is different from both the first profile and the second profile,
  wherein the third converting process includes:
    an upstream converting process to be performed for data corresponding to an upstream portion within the first overlap area and including an upstream end in the sub scanning direction, the upstream converting process being performed with reference to the second profile; and
    a downstream converting process to be performed for data corresponding to a downstream portion within the first overlap area and including a downstream end in the sub scanning direction, the downstream converting process being performed with reference to the first profile, and
  wherein the fifth converting process is performed with reference to the third profile.

11. The image processing apparatus according to claim 10,
  wherein the downstream portion is a portion in which the ratio of the pixels assigned with the N-th partial printing, in each raster line, is equal to or greater than a first threshold value, and
  wherein the upstream portion is a portion in which the ratio of the pixels assigned with the (N+1)-th partial printing, in each raster line, is equal to or greater than a second threshold value.

12. The image processing apparatus according to claim 9,
  wherein the first overlap area includes K raster lines, K being an integer equal to one or greater, the K raster lines being located at different positions in the sub scanning direction, each of the K raster lines including multiple pixels aligned in the main scanning direction,
  wherein the third overlap area includes L raster lines, L being an integer equal to one or greater, the L raster lines being located at different positions in the sub scanning direction, each of the L raster lines including multiple pixels aligned in the main scanning direction,
  wherein, in each of the K raster lines, a ratio of the pixels assigned with the N-th partial printing is higher as a location, in the sub scanning direction, is closer to a downstream end, in the sub scanning direction, and a ratio of the pixels assigned with the (N+1)-th partial printing is higher as a location, in the sub scanning direction, is closer to an upstream end, in the sub scanning direction, wherein, in each of the L raster lines, a ratio of the pixels assigned with the M-th partial printing is higher as a location, in the sub scanning direction, is closer to a downstream end, in the sub scanning direction, and a ratio of the pixels assigned with the (M+1)-th partial printing is higher as a location, in the sub scanning direction, is closer to an upstream end, in the sub scanning direction,
  wherein the third converting process is a first synthesizing conversion process to convert, for each of the K raster lines, the first color values to first synthesized color values,
  wherein the fifth converting process is a second synthesizing conversion process to convert, for each of the L raster lines, the first color values to second synthesized color values,
  wherein the first synthesized color values are the second color values obtained by synthesizing, in accordance with a first ratio, the second color values identified with reference to the first profile and the second color values identified with reference to the second profile, the first ratio being a ratio between the pixels assigned with the N-th partial printing and the pixels assigned with the (N+1)-th partial printing, and wherein the second synthesized color values are the second color values obtained by synthesizing, in accordance with a second ratio, the second color values identified with reference to the first profile and the second color values identified with reference to the second profile, the second ratio being a ratio between the pixels assigned with the M-th partial printing and the pixels assigned with the (M+1)-th partial printing.

13. A non-transitory computer-readable recording medium for an image processing apparatus which is configured to control a printing execution device having a print head provided with first type of nozzles configured to eject first type of ink, second type of nozzles configured to eject second type of ink, the second type of nozzles being arranged at positions different, in a main scanning direction, from positions where the first type of nozzles are arranged, a main scanning device configured to perform main scanning to move the print head in the main scanning direction relative to a printing medium, a sub scanning device configured to perform sub scanning to move the printing medium relative to the print head in a sub scanning direction which intersects with the main scanning direction, the printing execution device being configured to perform printing by performing partial printing of forming dots on the print medium using the print head with performing the main scanning and the sub scanning a plurality of times, the recording medium storing instructions which cause, when executed by a controller of the image processing apparatus, the image processing apparatus to perform:
    obtaining target image data including a plurality of first color values respectively corresponding to a plurality of pixels;
    generating, with use of the target image data, a plurality of pieces of partial printing data including N-th partial printing data for an N-th partial printing performed in a first printing direction, N being an integer greater than zero, and (N+1)-th partial printing data for an (N+1)-th partial printing performed in a second printing direction, the generating including a color conversion process of converting each of the plurality of first color values to the second color values;
    controlling the printing execution device to print a print image based on the target image data by causing the printing execution device to perform a plurality of times of the partial printing including the N-th partial printing and the (N+1)-th partial printing using the plurality of pieces of partial printing data,
    wherein an area in which the N-th partial printing is performed includes:
        a first overlap area in which dots are formed by both the N-th partial printing and the (N+1)-th partial printing; and
        a first non-overlap area which is located on a downstream side, in the sub scanning direction, with respect to the first overlap area, the first non-overlap area being an area in which dots are formed by the N-th partial printing but no dots are formed by the (N+1)-th partial printing,
    wherein an area in which the (N+1)-th partial printing is performed includes:
        the first overlap area; and
        a second non-overlap area which is located on an upstream side, in the sub scanning direction, with respect to the first overlap area, the second non-overlap area being an area in which no dots are formed by the N-th partial printing but dots are formed by the (N+1)-th partial printing, and
    wherein the color conversion process includes:
        a first converting process to be applied to data included in the target image data and corresponding to the first non-overlap area, the first converting process being performed with reference to a first profile;

a second converting process to be applied to data included in the target image data and corresponding to the second non-overlap area, the second converting process being performed with reference to a second profile; and a third converting process to be applied to data included in the target image data and corresponding to the first overlap area, the third converting process being different from the first converting process and the second converting process.

14. An image processing apparatus comprising:
a print head;
a carriage mounting the print head and configured to move the print head in a first direction relative to a printing medium;
a conveying device configured to move the printing medium relative to the print head in a second direction which intersects with the first direction;
a storage configured to store a first profile corresponding to the first direction and a second profile corresponding to a direction opposite to the first direction; and
a controller, the controller being configured to execute:

generating, using target image data including a plurality of first color values respectively corresponding to a plurality of pixels, a plurality of pieces of partial printing data including N-th partial printing data for an N-th partial printing performed in the first direction, N being an integer greater than zero, and (N+1)-th partial printing data for an (N+1)-th partial printing performed in the direction opposite to the first direction;

printing, using the print head, in a first printing area based on the N-th partial printing data, the first printing area including a first overlap area and a first non-overlap area; and printing, using the printing head, in a second printing area based on the (N+1)-th partial printing data, the second printing area including the first overlap area and a second non-overlap area, and wherein the controller is configured to execute:

a first converting, at the first non-overlap area, each of the plurality of first color values to a second color values with reference to the first profile;

a second converting, at the second non-overlap area, each of the plurality of first color values to the second color values with reference to the second profile; and a third converting, at the first overlap area, each of the plurality of first color values to the second color values, the third converting being different from the first converting and the second converting.

15. The image processing apparatus according to claim 14,
wherein the first overlap area is an area in which dots are formed by both the N-th partial printing and the (N+1)-th partial printing,
wherein the first non-overlap area is an area which is not overlapped with the first overlap area in the second direction, the first non-overlap area being an area in which dots are formed by the N-th partial printing but no dots are formed by the (N+1)-th partial printing, and
wherein the second non-overlap area is an area which is not overlapped with the first overlap area and the first non-overlap area in the second direction, the second non-overlap area being an area in which no dots are formed by the N-th partial printing but dots are formed by the (N+1)-th partial printing.

16. The image processing apparatus according to claim 14,
    wherein the first overlap area includes:
        an upstream portion being arranged closer to the first non-overlap area than the second non-overlap area,;
        a downstream portion being arranged closer to the second non-overlap area than the first non-overlap area; and
        a central portion being arranged between the upstream portion and the downstream portion,
    wherein the controller is configured to execute the third converting, at least at the central portion, performed with reference to a third profile, and
    wherein the storage is configured to store the third profile which is different from both the first profile and the second profile.

17. The image processing apparatus according to claim 16,
    wherein the controller is configured to execute:
        generating, using the target image data, (N+2)-th partial data to be used in (N+2)-th partial printing performed in the first direction; and
        printing, using the printing head, in a third printing area based on the (N+2)-th partial printing data, the third printing area including a second overlap area and a third non-overlap area,
    wherein the second overlap area is an area in which dots are formed by both the (N+1)-th partial printing and the (N+2)-th partial printing,
    wherein the third non-overlap area is an area which is not overlapped with the second overlap area in the second direction, the third non-overlap area being an area in which dots are formed by the (N+2)-th partial printing but no dots are formed by the (N+1)-th partial printing,
    wherein the controller is configured to execute a fourth converting, at the second overlap area, each of the plurality of first color values to the second color values with reference to a fourth profile, and
    wherein the storage is further configured to store the fourth profile which is different from any of the first profile, the second profile and the third profile.

18. The image processing apparatus according to claim 16,
    wherein the controller is configured to execute:
        generating, using the target image data, (N+3)-th partial data to be used in (N+3)-th partial printing performed in the direction opposite to the first direction;
        printing, using the printing head, in a fourth printing area based on the (N+3)-th partial printing data, the fourth printing area including a third overlap area and a fourth non-overlap area; and
        wa fifth converting, at the third overlap area, each of the plurality of first color values to the second color values with reference to the third profile.

19. The image processing apparatus according to claim 18, wherein a length of the third overlap area, in the second direction, is longer than a length of the first overlap area.

20. The image processing apparatus according to claim 19,
wherein the third overlap area is an area in which dots are formed by both the (N+2)-th partial printing and the (N+3)-th partial printing, and
wherein the fourth non-overlap area is an area which is not overlapped with the third overlap area in the second direction, the fourth non-overlap area being an area in which dots are formed by the (N+3)-th partial printing but no dots are formed by the (N+2)-th partial printing.